United States Patent
Evans et al.

(10) Patent No.: US 11,466,559 B2
(45) Date of Patent: Oct. 11, 2022

(54) DOWNHOLE TOOL SENSOR ARRANGEMENTS AND ASSOCIATED METHODS AND SYSTEMS

(71) Applicant: Baker Hughes Oilfield Operations LLC, Houston, TX (US)

(72) Inventors: Kenneth R. Evans, Spring, TX (US); Jeremy Todd Townsend, The Woodlands, TX (US); Jason Habernal, Magnolia, TX (US); Cecil Schandorf, Cypress, TX (US); Chaitanya K. Vempati, Conroe, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 16/945,471

(22) Filed: Jul. 31, 2020

(65) Prior Publication Data
US 2022/0034223 A1 Feb. 3, 2022

(51) Int. Cl.
*E21B 47/02* (2006.01)
*E21B 49/00* (2006.01)
(Continued)

(52) U.S. Cl.
CPC .............. *E21B 47/02* (2013.01); *E21B 45/00* (2013.01); *E21B 47/017* (2020.05);
(Continued)

(58) Field of Classification Search
CPC ...... E21B 47/00; E21B 47/017; E21B 47/024; E21B 47/02
See application file for complete search history.

(56) References Cited

U.S. PATENT DOCUMENTS 6,347,282 B2   2/2002   Estes et al.
6,484,589 B1   11/2002  Brock
(Continued)

FOREIGN PATENT DOCUMENTS

EP   1253285 B1   9/2010
EP   3341564 B1   10/2019
(Continued)

OTHER PUBLICATIONS

International Search Report for International Application No. PCT/US2021/042544 dated Nov. 10, 2021, 3 pages.
(Continued)

*Primary Examiner* — Tara Schimpf
(74) *Attorney, Agent, or Firm* — TraskBritt

(57) ABSTRACT

A downhole sensor system may include at least two accelerometers having at least two axes of measurement. The at least two accelerometers may include a first accelerometer in a first position and a second accelerometer in a second position. A first axis of the second accelerometer may be substantially coaxial with a first axis of the first accelerometer and a second axis of the second accelerometer may be parallel to and offset from a second corresponding axis of the first accelerometer. The downhole sensor system may further include at least one processor, and at least one non-transitory computer-readable storage medium storing instructions thereon that when executed by the at least one processor may cause the processor to measure a first acceleration from the first accelerometer and measure a second acceleration from the second accelerometer. When executed by the at least one processor the instructions may also cause the processor to calculate acceleration properties of the downhole sensor system based on acceleration measurements of the first accelerometer and the second accelerometer.

18 Claims, 10 Drawing Sheets

(51) Int. Cl.
*E21B 45/00* (2006.01)
*G01P 15/18* (2013.01)
*E21B 47/26* (2012.01)
*E21B 47/017* (2012.01)
*E21B 47/024* (2006.01)

(52) U.S. Cl.
CPC .......... *E21B 47/024* (2013.01); *E21B 47/26* (2020.05); *E21B 49/003* (2013.01); *G01P 15/18* (2013.01)

(56) References Cited

U.S. PATENT DOCUMENTS

| | | | |
|---|---|---|---|
| 6,859,751 | B2 | 2/2005 | Cardarelli |
| 6,892,812 | B2 | 5/2005 | Niedermayr et al. |
| 6,895,678 | B2 | 5/2005 | Ash et al. |
| 6,945,330 | B2 | 9/2005 | Wilson et al. |
| 7,134,334 | B2 | 11/2006 | Schirmer et al. |
| 7,152,680 | B2 | 12/2006 | Wilson et al. |
| 7,363,717 | B2 | 4/2008 | Ekseth et al. |
| 7,644,760 | B2 | 1/2010 | Woloson |
| 7,685,732 | B2 | 3/2010 | Davies et al. |
| 7,886,845 | B2 | 2/2011 | King et al. |
| 8,024,980 | B2 | 9/2011 | Arms et al. |
| 8,489,333 | B2 | 7/2013 | Bonavides et al. |
| 9,518,849 | B2 | 12/2016 | Lee et al. |
| 10,006,280 | B2 | 6/2018 | Logan et al. |
| 10,036,241 | B2 | 7/2018 | Mcginnis et al. |
| 10,280,735 | B2 | 5/2019 | Finke et al. |
| 2006/0065395 | A1 | 3/2006 | Snell |
| 2015/0101865 | A1* | 4/2015 | Mauldin ............... E21B 47/024 175/40 |
| 2015/0330210 | A1 | 11/2015 | Lozinsky |
| 2017/0051578 | A1 | 2/2017 | Christie et al. |
| 2017/0204705 | A1 | 7/2017 | King |
| 2018/0066513 | A1 | 3/2018 | Sugiura et al. |
| 2018/0180418 | A1* | 6/2018 | Estes ..................... E21B 49/003 |
| 2019/0169979 | A1* | 6/2019 | Nguyen ................ E21B 47/024 |
| 2019/0234781 | A1 | 8/2019 | Mess et al. |
| 2019/0345779 | A1 | 11/2019 | Kennedy et al. |
| 2019/0383132 | A1 | 12/2019 | Laastad |
| 2020/0011751 | A1 | 1/2020 | Kazemi Miraki et al. |
| 2020/0173776 | A1* | 6/2020 | Hayes ..................... B23B 49/00 |
| 2021/0132244 | A1* | 5/2021 | Ogundare ............... E21B 47/00 |

FOREIGN PATENT DOCUMENTS

| | | |
|---|---|---|
| WO | 2007/014446 A1 | 2/2007 |
| WO | 2011/056263 A1 | 5/2011 |

OTHER PUBLICATIONS

International Written Opinion for International Application No. PCT/US2021/042544 dated Nov. 10, 2021, 5 pages.

* cited by examiner

DOWNHOLE TOOL SENSOR ARRANGEMENTS AND ASSOCIATED METHODS AND SYSTEMS

TECHNICAL FIELD

Embodiments of the present disclosure generally relate to earth-boring operations. In particular, embodiments of the present disclosure relate to downhole sensors, and related systems, apparatus, and methods.

BACKGROUND

Wellbore drilling operations may involve the use of an earth-boring tool at the end of a long string of pipe commonly referred to as a drill string. An earth-boring tool may be used for drilling through formations, such as rock, dirt, sand, tar, etc. In some cases, the earth-boring tool may be configured to drill through additional elements that may be present in a wellbore, such as cement, casings (e.g., a wellbore casing), discarded or lost equipment (e.g., fish, junk, etc.), packers, etc. In some cases, earth-boring tools may be configured to drill through plugs (e.g., fracturing plugs, bridge plugs, cement plugs, etc.). In some cases, the plugs may include slips or other types of anchors and the earth-boring tool may be configured to drill through the plug and any slip, anchor, and other component thereof.

The drill string and/or the earth-boring tool may include sensors configured to capture and/or store information acquired downhole. The downhole information may include environmental properties, such as downhole temperature, pressure, etc. In some cases, the downhole information may include operational measurements, such as weight on bit (WOB), rotational speed (RPM), fluid flow rates, etc. In some cases, the downhole information may include formation properties, such as lithology, porosity, strength, etc.

The downhole information may be collected and/or analyzed in real-time or at a later time. For example, the downhole information may be collected through a logging while drilling (LWD) or measuring while drilling (MWD) operation. The downhole information may enable an operator to make decisions, such as a type of earth-boring tool to use, operational decisions, tripping decisions, path decisions, etc. In some cases, the downhole information may be collected in a database configured to predict and/or model future earth-boring operations.

BRIEF SUMMARY

Embodiments of the present disclosure may include a downhole tool. The downhole tool may include at least two accelerometers having at least two axes of measurement. The at least two accelerometers may include a first accelerometer in a first position. The at least two accelerometers may also include a second accelerometer in a second position. A first axis of the second accelerometer may be coaxial with a first axis of the first accelerometer and a second axis of the second accelerometer may be parallel to and offset from a second corresponding axis of the first accelerometer.

Another embodiment of the present disclosure may include a downhole sensor system. The downhole sensor system may include at least two accelerometers having at least two axes of measurement. The at least two accelerometers may include a first accelerometer in a first position. The at least two accelerometers may further include a second accelerometer in a second position. A first axis of the second accelerometer may be substantially coaxial with a first axis of the first accelerometer and a second axis of the second accelerometer may be parallel to and offset from a second corresponding axis of the first accelerometer. The downhole sensor system may further include at least one processor, and at least one non-transitory computer-readable storage medium storing instructions thereon. When executed by the at least one processor the instructions may cause the processor to measure a first acceleration from the first accelerometer. When executed by the at least one processor the instructions may further cause the processor to measure a second acceleration from the second accelerometer. When executed by the at least one processor the instructions may also cause the processor to calculate acceleration properties of the downhole sensor system based on acceleration measurements of the first accelerometer and the second accelerometer.

Another embodiment of the present disclosure may include a method of calculating acceleration properties of a downhole tool. The method may include synchronizing a first accelerometer and a second accelerometer. The method may further include measuring a first acceleration from the first accelerometer. The method may also include measuring a second acceleration from the second accelerometer. A first axis of the second accelerometer may be coaxial with a first axis of the first accelerometer and a second axis of the second accelerometer may be parallel to and offset from a second corresponding axis of the first accelerometer. The method may further include calculating the acceleration properties of the downhole tool based on acceleration measurements of the first accelerometer and the second accelerometer.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

The illustrations presented herein are not meant to be actual views of any particular downhole system or component thereof, but are merely idealized representations employed to describe illustrative embodiments. The drawings are not necessarily to scale.

As used herein, the terms "earth-boring tool" means and includes any type of bit or tool used for drilling during the formation or enlargement of a wellbore in a subterranean formation. For example, earth-boring tools include fixed-cutter bits, roller cone bits, percussion bits, core bits, eccentric bits, bicenter bits, reamers, mills, drag bits, hybrid bits (e.g., rolling components in combination with fixed cutting elements), and other drilling bits and tools known in the art.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even at least about 100% met.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

Figure 1:
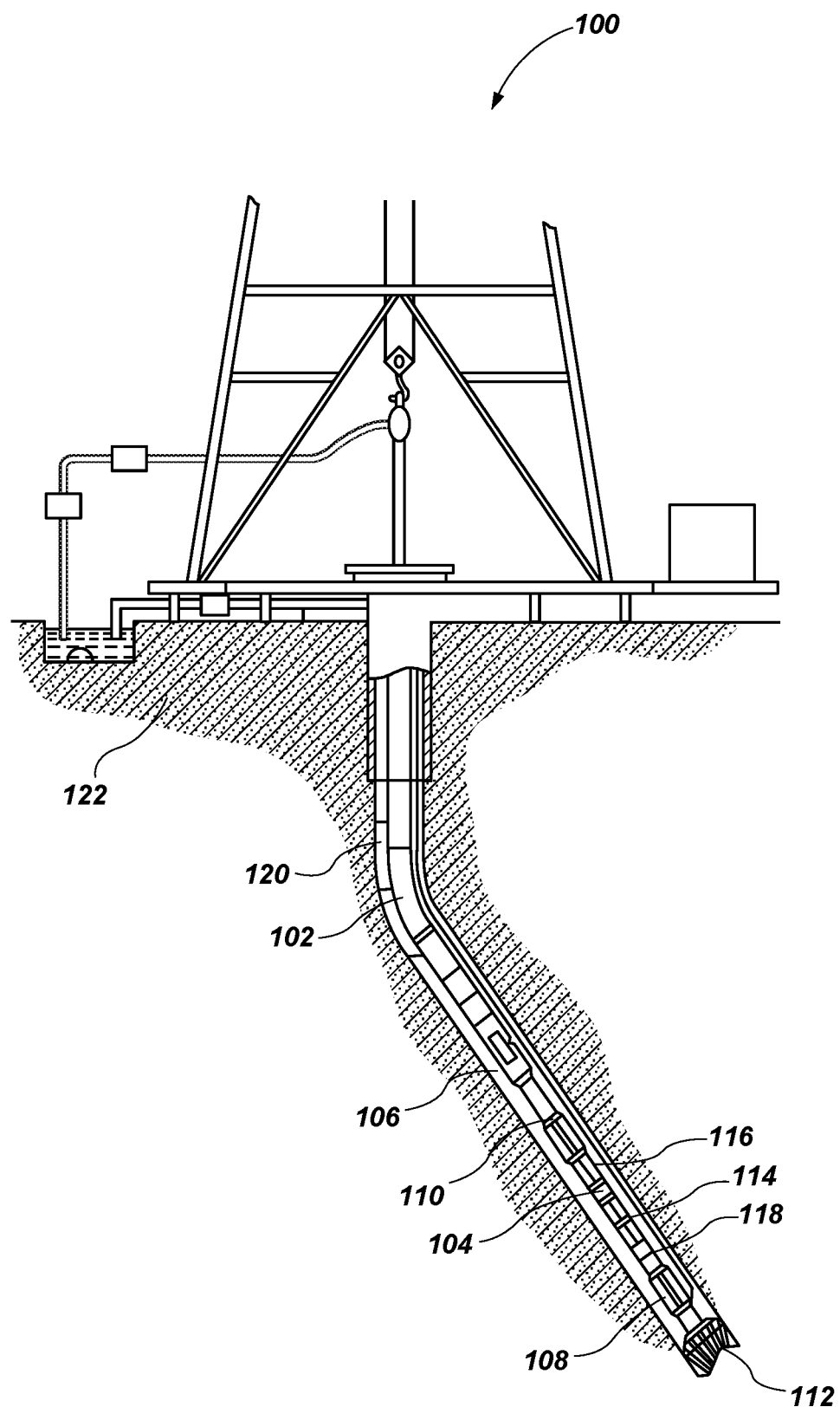
FIG. 1 illustrates an earth-boring system in accordance with an embodiment of the present disclosure.

FIG. 1 illustrates an earth-boring system 100. An earth-boring system 100 may include a drill string 102. The drill string 102 may include multiple sections of drill pipe coupled together to form a long string of drill pipe. A forward end of the drill string 102 may include a bottom hole assembly 104 (BHA). The BHA 104 may include components, such as a motor 106 (e.g., mud motor), one or more reamers 108 and/or stabilizers 110, and an earth-boring tool 112 such as a drill bit. The BHA 104 may also include electronics, such as sensors 114, modules 116, and/or tool control components 118. The drill string 102 may be inserted into a borehole 120. The borehole 120 may be formed by the earth-boring tool 112 as the drill string 102 proceeds through a formation 122. The tool control components 118 may be configured to control an operational aspect of the earth-boring tool 112. For example, the tool control components 118 may include a steering component configured to change an angle of the earth-boring tool 112 with respect to the drill string 102 changing a direction of advancement of the drill string 102. The tool control components 118 may be configured to receive instructions from an operator at the surface and perform actions based on the instructions. In some embodiments, control instructions may be derived downhole within the tool control components 118, such as in a closed loop system, etc.

The sensors 114 may be configured to collect information regarding the downhole conditions such as temperature, pressure, vibration, fluid density, fluid viscosity, cutting density, cutting size, cutting concentration, etc. In some embodiments, the sensors 114 may be configured to collect information regarding the formation, such as formation composition, formation density, formation geometry, etc. In some embodiments, the sensors 114 may be configured to collect information regarding the earth-boring tool 112, such as tool temperature, cutter temperature, cutter wear, weight on bit (WOB), torque on bit (TOB), string rotational speed (RPM), tilt angle, azimuth, drilling fluid pressure at the earth-boring tool 112, fluid flow rate at the earth-boring tool 112, etc.

The information collected by the sensors 114 may be processed, stored, and/or transmitted by the modules 116. For example, the modules 116 may receive the information from the sensors 114 in the form of raw data, such as a voltage (e.g., 0-10 VDC, 0-5 VDC, etc.), an amperage (e.g., 0-20 mA, 4-20 mA, etc.), or a resistance (e.g., resistance temperature detector (RTD), thermistor, etc.). The module 116 may process raw sensor data and transmit the data to the surface on a communication network, using a communication network protocol to transmit the raw sensor data. The communication network may include, for example a communication line, mud pulse telemetry, electromagnetic telemetry, wired pipe, etc. In some embodiments, the modules 116 may be configured to run calculations with the raw sensor data.

In some embodiments, the downhole information may be transmitted to the operator at the surface or to a computing device at the surface. For example, the downhole information may be provided to the operator through a display, a printout, etc. In some embodiments, the downhole information may be transmitted to a computing device that may process the information and provide the information to the operator in different formats useful to the operator. For example, measurements that are out of range may be provided in the form of alerts, warning lights, alarms, etc., some information may be provided live in the form of a display, spreadsheet, etc., whereas other information that may not be useful until further calculations are performed may be processed and the result of the calculation may be provided in the display, print out, spreadsheet, etc.

When collecting data on a downhole tool, some properties may be difficult to measure separately, such as rotational acceleration and/or translational acceleration. For example, accelerometers may be used to measure rotational acceleration and/or translational acceleration. When the downhole tool experiences both rotational acceleration and translational acceleration the accelerometers may measure both the rotational acceleration and the translational acceleration. Therefore, accurately measuring translational acceleration and rotational acceleration without the measurement being affected of the other acceleration may be difficult. In some embodiments, complex specialized sensors may be required to measure properties such as rotational speed, tilt angle, and azimuth that may be made available with known values for translational acceleration and rotation acceleration measurements. The complex specialized sensors may have higher power requirements and/or higher space requirements than accelerometers.

Embodiments of the present disclosure may include a sensor arrangement configured to enable accurate measurements to be calculated for both rotational acceleration and translational acceleration from multiple accelerometers and/or other combinations of downhole sensors.

Figure 2:
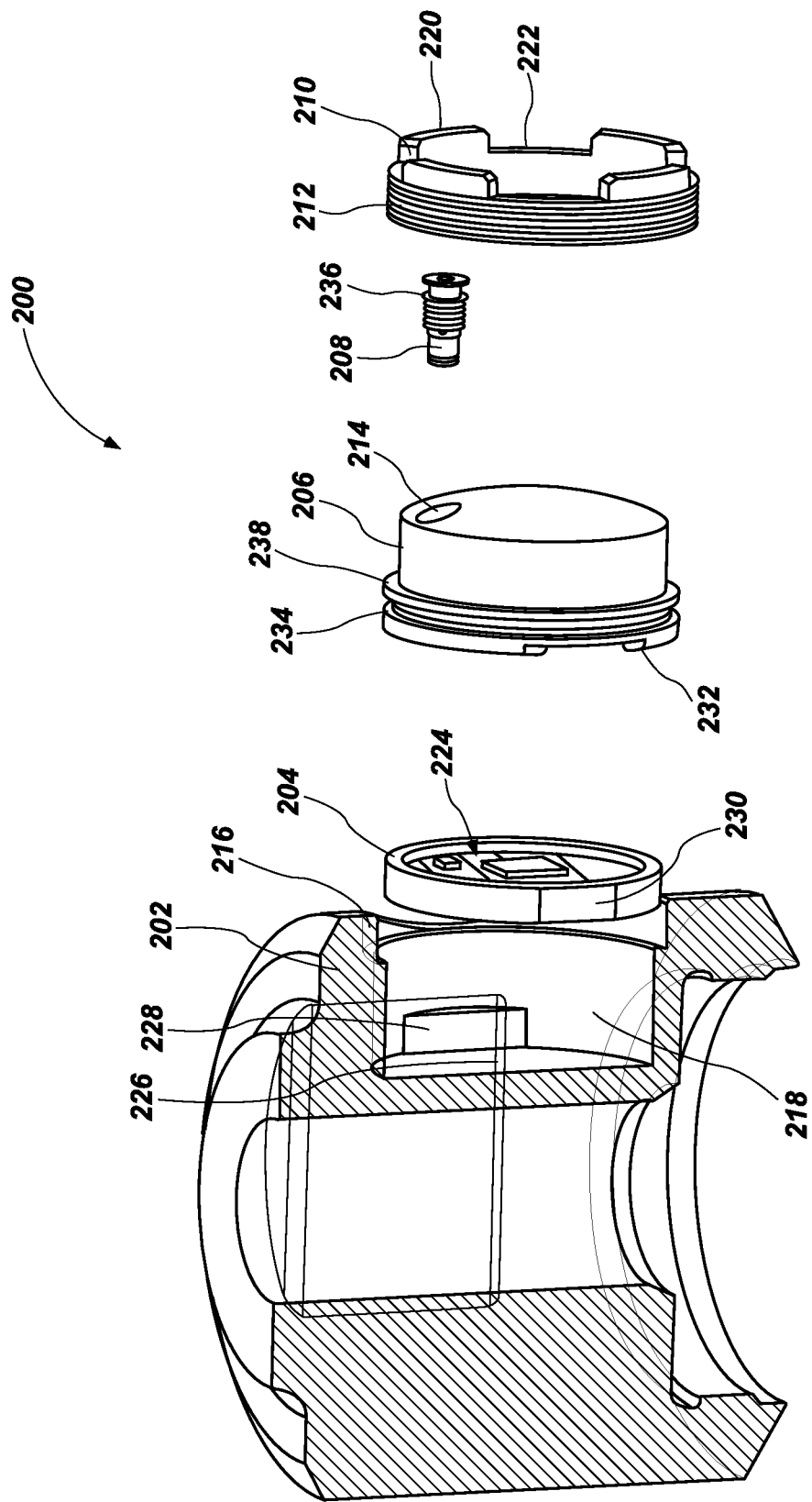
FIG. 2 illustrates an exploded view of an embodiment of a sensor assembly in accordance with an embodiment of the present disclosure.

FIG. 2 illustrates an exploded view of an embodiment of a self-contained sensor assembly 200. Some examples of self-contained sensor assemblies and methods of operation the sensor assemblies are described in, for example, U.S.

patent application Ser. No. 16/945,428 filed on even date herewith and titled "DOWNHOLE SENSOR APPARATUS AND RELATED SYSTEMS, APPARATUS, AND METHODS" (attorney docket number 1684-P15456US (64BSG-508001-US)), the disclosure of which is incorporated herein in its entirety by this reference. The self-contained sensor assembly 200 may be configured to be inserted into a downhole tool 202, such as a drill bit, an under reamer, a reamer, a stabilizer, a mud motor, etc. The self-contained sensor assembly 200 may include a sensor structure 204, a cap 206, a data port 208, and a locking ring 210.

The sensor structure 204 may include a sensor board 224 (e.g., circuit board). The sensor board 224 may house one or more sensors, such as accelerometers, pressure sensors, temperature sensors, vibration sensors, strain gauges, gyroscopes, gyrometers, magnetometers, etc. The one or more sensors may be arranged about the sensor board 224 such that multiple different types of information may be measured and/or calculated based on the sensor readings. For example, arrangements of multiple accelerometers may enable the sensor board 224 to measure and/or calculate operational elements, such as rotational speed, tilt angle, azimuth, azimuthal acceleration, etc. In some embodiments, multiple different types of sensors may be included on the same sensor board 224. For example, the sensor board 224 may include multiple accelerometers, as well as one or more pressure sensors, temperature sensors, vibration sensors, strain gauges, gyroscopes, gyrometers, and/or magnetometers.

In some embodiments, the sensor board 224 may include a processor and a memory storage device, configured to process and/or store data gathered (e.g., sensed, detected, measured, etc.) by the one or more sensors. For example, the processor and memory storage may be configured to process raw data from the one or more sensors and store the resulting downhole information. In some embodiments, the processor and memory storage may store the raw sensor information, such as in a database or array, such that a processor may calculate downhole information from the raw sensor information after the raw data is extracted from the memory storage device. In some embodiments the processor may be part of an external device configured to calculate downhole information after the data is transmitted from the sensor board 224 to the external device.

In some embodiments, the sensor board 224 may include a power storage device, such as a battery, capacitor, etc. In some embodiments, the sensor board 224 may include power connections, such as leads, wires, terminals, posts, plugs, etc., configured to connect the sensor board 224 to a remote power source, such as a battery or battery pack.

The sensor structure 204 may be configured to provide structural support to the sensor board 224. For example, the sensor structure 204 may substantially surround the sensor board 224. In some embodiments, the sensor structure 204 and the sensor board 224 may be substantially circular, such that the sensor structure 204 may be an annular structure substantially surrounding the sensor board 224. The sensor structure 204 may extend above and below a top and bottom surface of the sensor board 224 greater than any semiconductor device attached to the surface of the sensor board 224. For example, if placed against a substantially flat surface the sensor structure 204 may be the only portion of the sensor structure 204 and the sensor board 224 to contact the substantially flat surface. In some embodiments, the sensor structure 204 may include additional structural pieces, such as bracing and/or mounting brackets to provide further support and protection to the sensor board 224.

In some embodiments, the sensor structure 204 may be configured to orient the sensor board 224 relative to the downhole tool 202. For example, the sensor structure 204 may be configured to be disposed into a recess 218 in the downhole tool 202. The sensor structure 204 may rest against a recess base 226 within the recess 218 of the downhole tool 202. The sensor structure 204 may include a key surface 230 configured to orient the sensor structure 204 within the recess 218. For example, the recess 218 may include a complementary orientation key 228 configured to interface with the key surface 230 in the sensor structure 204. As illustrated in FIG. 2, the orientation key 228 and the key surface 230 may be complementary flat (e.g., planar or straight) surfaces in otherwise circular surfaces. In some embodiments, the orientation key 228 and the key surface 230 may be a complementary protrusion and groove, such as a key and a key way.

In some embodiments, the orientation key 228 and the key surface 230 may be configured to only allow the sensor structure 204 to be inserted in the recess 218 in a single orientation. In some embodiments, the orientation key 228 and the key surface 230 may be configured to only allow the sensor structure 204 to be inserted into the recess 218 in one of a select number of orientations such as two orientations, four orientations, etc. For example, the orientation key 228 and the key surface 230 may allow the sensor structure 204 to be inserted into the recess 218 in two orientations each 180 degrees offset from the other. In some embodiments, the orientation key 228 and the key surface 230 may allow the sensor structure 204 to be inserted into the recess 218 in one of four orientations each 90 degrees offset from the other.

Controlling the orientation of the sensor board 224 may enable sensors thereon to measure specific characteristics of the downhole tool 202, such as orientation, rotational velocity, vibrations, torque, tilt, etc. For example, positioning several sensors in specific orientations relative to the downhole tool 202 may enable differences between the sensors to be used to calculate specific characteristics of the downhole tool 202 as described below.

The cap 206 may be configured to rest against a top surface of the sensor structure 204. The cap 206 may secure the sensor structure 204 within the recess 218 in the downhole tool 202. For example, the cap 206 may sandwich the sensor structure 204 between a base 232 of the cap 206 and the recess base 226. The cap 206 may be configured to separate the sensor board 224 from the downhole environment. For example, the downhole environment may include high temperatures, high pressures, debris, and fluids (e.g., oil, water, drilling mud, caustic fluids, corrosive fluids, etc.). The cap 206 may be formed from a material configured to withstand the downhole environment and protect the sensor board 224 from the elements of the downhole environment that may damage the sensor board 224 and/or the components thereof.

The cap 206 may include one or more seal grooves 234 around the base 232. The seal grooves 234 may be configured to receive one or more seals configured to form a seal between the cap 206 and a wall of the recess 218 in the downhole tool 202. The one or more seals may be configured to substantially prevent the ingress and/or egress of fluids into and/or out of the cap 206.

The cap 206 may include an aperture 214. The aperture 214 may be configured to receive the data port 208. The data port 208 may be coupled to the sensor board 224 through the cap 206. For example, the data port 208 may be connected to wires or leads extending from the sensor board 224. In some embodiments, the data port 208 may be connected to a connector, such as a pin connector, locking connector, terminal connector, etc. In some embodiments, the data port 208 may be wirelessly connected to the sensor board 224, such as through a radio frequency transmitter and/or receiver.

In some embodiments, the data port 208 may be configured as a data access port of the sensor board 224. For example, the data port 208 may be operatively connected to the sensor board 224, such as to the processor or memory device in the sensor board 224. The data port 208 may be configured to enable a connection to the sensor board 224 through the cap 206 without requiring the removal of the self-contained sensor assembly 200 from the downhole tool 202. For example, the data port 208 may include a connector configured to receive a wired connection, such as a network connection (e.g., Ethernet, RJ45, RJ11, RJ12, RS485, etc.) or serial connection (e.g., DB9, RS-232, universal serial bus (USB), etc.) from an external source, such as a computer, tablet, network connection, server, controller, etc.

In some embodiments, the data port 208 may be configured to wirelessly transmit data from the sensor board 224. For example, the data port 208 may be a wireless receiver and/or transmitter. The data port 208 may be configured to transmit data under a wireless protocol, such as BLUETOOTH®, 2G, 3G, 4G, 5G, RFID, etc. For example, the data port 208 may receive downhole information and/or raw sensor data, such as the data stored in the memory device of the sensor board 224.

In some embodiments, the data port 208 may be configured to receive data, such as sensor data, configuration data, programming data, firmware, updates, etc., from an external device (e.g., computer, tablet, network, server, cloud, sensor, sensor apparatus, etc.). For example, the data port 208 may be configured to receive the data from the external device and push the data into the sensor board 224. In some embodiments, the data may change an operation of the sensor board 224, such as a sequence of operations, a method of converting sensor readings, a method of storing sensor readings, etc. In some embodiments, the data may correct software problems, such as software patches, bug fixes, etc. In some embodiments, the data may configure the sensor board 224 for operation in a different type of operation, such as for placement on a different type of tool, placement in a different portion of a drill string, using a tool in a different operation, etc. In some embodiments, the data may be sensor readings transmitted from another sensor apparatus.

In some embodiments, the cap 206 may include a removable plug 236 over the aperture 214. For example, after the data port 208 is inserted into the aperture 214 of the cap 206, the plug 236 may be installed into the aperture 214. The plug 236 may be configured to protect the data port 208 from the downhole environment, similar to the protections afforded to the sensor board 224 by the cap 206. The plug 236 may be configured to be removed to enable a connection with the data port 208 from an external device. For example, with the plug 236 removed a wired connection, as described above, may be connected to the data port 208. In some embodiments, removing the plug 236 may enable the data port 208 to send and/or receive a reliable wireless signal to and/or from an external device as described above.

In some embodiments, the cap 206 may include an area of the cap 206 that is configured to be transparent to radio frequencies (e.g., RF transparent, RF window, etc.). For example, at least a portion of the cap 206 may be formed from a material that is substantially transparent to radio frequencies. A radio frequency transparent material is a material that radio frequency fields or signals may penetrate without losing energy to heat or reflecting off the material, such as polytetrafluoroethylene (e.g., PTFE, TEFLON®), quartz, glass materials, etc. In some embodiments, the cap 206 may be entirely formed from a radio frequency transparent material. The radio frequency transparent material may enable a transmitter and/or receiver to send and/or receive radio signals through the cap 206.

In some embodiments, the data port 208 may be formed in a manner to withstand the downhole environment without the plug 236. For example, the data port 208 may be formed from materials configured to withstand the downhole environment. In some embodiments, the data port 208 may include a type of connection configured to protect the conducting elements, such as a covered connection or a wireless connection.

The cap 206 may include a ridge 238 above the seal grooves 234. The locking ring 210 may be configured to rest against the ridge 238 securing the cap 206 in the recess 218 of the downhole tool 202. The locking ring 210 may include threads 212 configured to interface with complementary threads 216 in the downhole tool 202. For example, once the sensor structure 204 and the cap 206 are disposed in the recess 218 of the downhole tool 202, the locking ring 210 may engage the threads 216 in the recess 218 with the threads 212 of the locking ring 210. The locking ring 210 may be threaded into the recess 218 until the locking ring 210 engages the ridge 238 of the cap 206.

The locking ring 210 may have an inside diameter that is substantially the same or greater than a diameter of the cap 206 above the ridge 238. For example, the locking ring 210 may be configured to pass over a top portion of the cap 206 to rest on the ridge 238.

The locking ring 210 may include one or more ridges 220 separated by one or more valleys 222 on a surface of the locking ring 210. The ridges 220 and the valleys 222 may be arranged in a pattern about a circumference of the locking ring 210. The ridges 220 and the valleys 222 may be configured to be engaged by a tool, such as a socket, wrench, screw driver, etc., to tighten and/or loosen the locking ring 210 from the downhole tool 202.

The locking ring 210 may enable the sensor structure 204 and the cap 206 to be installed in a specific orientation relative to each other and the downhole tool 202. As discussed above, the sensor structure 204 may include a key surface 230 configured to limit the orientation of the sensor structure 204 and the sensor board 224 relative to the downhole tool 202. The data port 208 may be installed through the aperture 214 in the cap 206. In some embodiments, the aperture 214 may need to be arranged over a specific portion of the sensor board 224 to enable a connection between the data port 208 and the sensor board 224. In some embodiments, wires may extend from the sensor board 224 through the aperture 214 for connection to the data port 208. Turning the cap 206 relative to the sensor board 224 multiple times, such as to screw in the cap 206 may cause the wires to twist multiple times, which may cause damage to the wires and/or the sensor board 224 where the wires connect to the sensor board 224. The locking ring 210 may enable the sensor structure 204 and the cap 206 to be disposed into the recess 218 in the downhole tool 202 with minimal twisting of the sensor structure 204 and/or the cap 206 relative to one another and the downhole tool 202.

Figure 3:
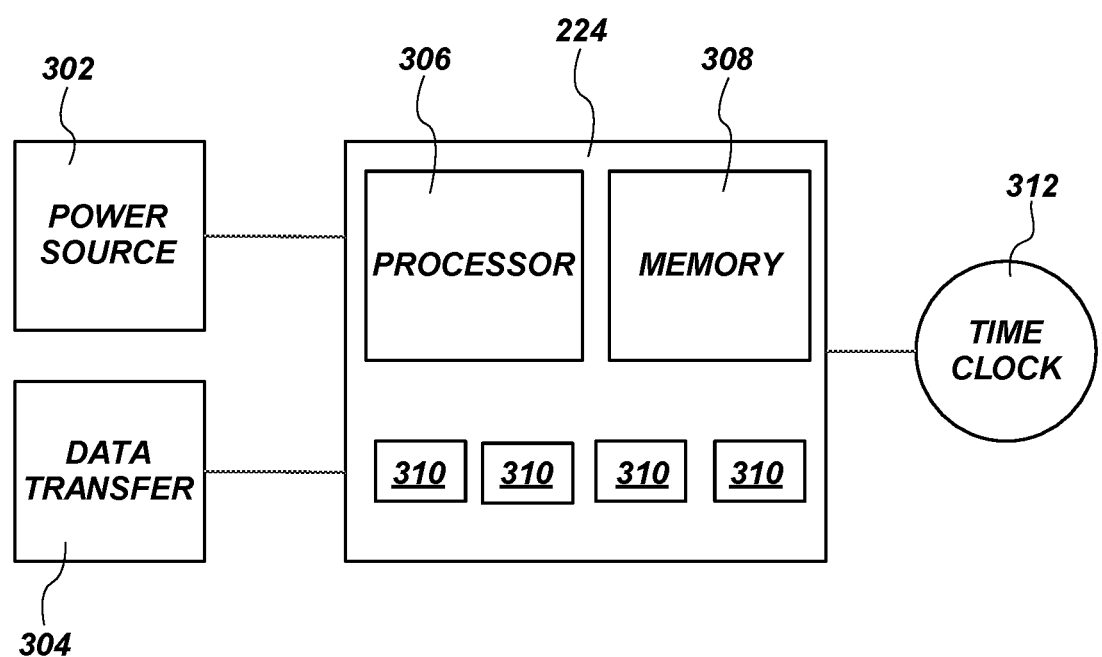
FIG. 3 illustrates a schematic view of a sensor assembly in accordance with an embodiment of the present disclosure.

FIG. 3 illustrates a schematic view of the sensor board 224 and associated components. The sensor board 224 may include a processor 306 and a memory storage device 308. The memory storage device 308 may be configured to store instructions for the processor 306. In some embodiments, the memory storage device 308 may be configured to store readings from sensors 310 coupled to the sensor board 224.

In some embodiments, the processor 306 may be configured to control features of the sensor board 224, such as sampling rates, starting and/or stopping data recording; transmitting and/or receiving data and or instructions, etc. For example, the processor 306 may start recording data once the processor 306 determines that the sensor board 224 and the associated downhole tool 202, 402 are downhole. The processor 306 may periodically collect data from one or more sensors 310 of the sensor board 224. When the sensors 310 return values that coincide with downhole conditions, the processor 306 may determine that the sensor board 224 and the associated downhole tool 202, 402 are downhole and begin recording data from the sensors 310.

In some embodiments, the processor 306 may be configured to perform calculations with the raw sensor data provided by the sensors 310. For example, the processor may collect data from one or more accelerometers and determine operational parameters of the downhole tool 202, 402, such as rotational speed, bit direction, tilt, azimuth, etc. In some embodiments, the processor 306 may control transfer and storage of the raw sensor data such as organizing the raw sensor data into arrays, data bases, etc., in a manner to provide the raw sensor data to a separate processor and/or computing device for performing the calculations and conversions.

The sensor board 224 may be coupled to a power source 302, such as a battery or battery pack. The power source 302 may be configured to power the sensor board 224, the processor 306, the sensors 310, and/or any other components coupled directly or indirectly to the sensor board 224. In some embodiments, the power source 302 may be an external power source, such that the power source 302 is not directly attached to the sensor board 224. For example, the power source 302 may be located in the cap 206, 406 as described above, and electrically coupled to the sensor board 224 through wiring. In some embodiments, the power source 302 may be directly coupled to the sensor board 224. For example, the power source 302 may be a component directly soldered to the sensor board 224. In some embodiments, the sensor board 224 may include a battery receptacle directly coupled to the sensor board 224. The battery receptacle may be configured to receive a battery, such as a button cell battery, to act as the power source 302.

The sensor board 224 may be coupled to a data transfer device 304, such as a data port 208, transmitter, receiver, etc., as described above. The data transfer device 304 may be configured to transfer data from and/or to the sensor board 224. For example, the data transfer device 304 may be configured to transfer sensor data from the sensor board 224 to another component of the drill string or downhole tool 202, 402. In some embodiments, the data transfer device 304 may be configured to transfer sensor data to a computing device separate from the drill string. In some embodiments, the data transfer device 304 may be configured to receive sensor data from another component of the drill string or downhole tool 202, 402. In some embodiments, the data transfer device 304 may be configured to receive data from an external computer, such as set-up data, firmware updates, programming updates, sensor configurations, etc.

In some embodiments, the data transfer device 304 may be an external device configured to couple to the sensor board 224 through a wired or terminal connection. For example, as described above with respect to FIGS. 2 and 3, the data port 208 may be coupled to the sensor board 224 through the cap 206. In some embodiments, the data transfer device 304 may be coupled directly to the sensor board 224. For example, the data transfer device 304 may be a transmitter and/or receiver positioned on the sensor board 224. The transmitter and/or receiver may be configured to transmit and/or receive signals, such as radio frequency signals, through the cap 206. For example, the cap 206 may include a radio frequency transparent portion (e.g., an RF transparent cap, an RF window, etc.).

The sensor board 224 may include a timing device 312, such as a time clock. In some embodiments, the timing device 312 may be configured to provide triggers to the processor 306. The processor 306 may be configured to execute specific commands on different triggers. For example, some sensor measurements may need to be measured at substantially the same time to facilitate calculations using sensor measurements from more than one sensor 310. The timing device 312 may provide a trigger to the processor 306 such that the measurements may be taken from each of the associated sensors 310 when the trigger from the timing device 312 is received by the processor 306. In some embodiments, the timing device 312 may be configured to provide a trigger to individual sensors, such as integrated digital sensors (e.g., integrated digital accelerometers), such that each of the individual sensors provide data to the processor when the trigger is received.

In some embodiments, the timing device 312 may be directly coupled to the sensor board 224. For example, the timing device 312 may be a component soldered directly to the sensor board 224. In some embodiments, the timing device 312 may be a remote device electrically coupled to the sensor board 224 through wiring or terminals. In some embodiments, the timing device 312 may be integrated into the processor 306 (e.g., embedded in the processor 306).

Figure 4:
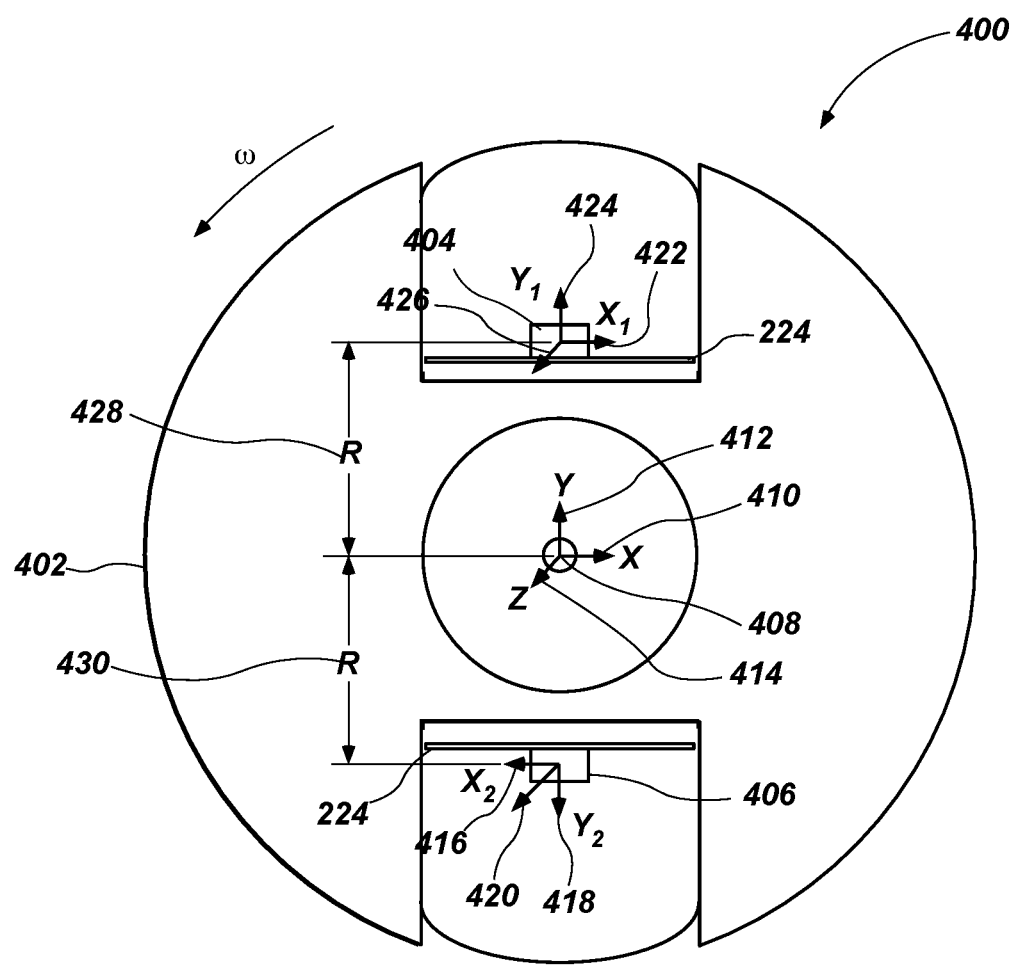
FIG. 4 illustrates a cross-sectional view of a downhole tool having a sensor arrangement according to an embodiment of the present disclosure.

FIG. 4 illustrates a sensor arrangement 400 on a downhole tool 402. The sensor arrangement 400 may include a first accelerometer 404 and a second accelerometer 406. The first accelerometer 404 and the second accelerometer 406 may be coupled to separate sensor boards 224. For example, the first accelerometer 404 may be coupled to a first sensor board 224 in a first self-contained sensor assembly 200 on a first side of the downhole tool 402. The second accelerometer 406 may be coupled to a second sensor board 224 in a second self-contained sensor assembly 200 on a second side of the downhole tool 402 opposite the first side of the downhole tool 402.

The downhole tool 402 may have a substantially circular cross-section about a tool center 408. The downhole tool 402 may have three axes extending from the tool center 408 at the cross-section. For example, an X axis 410 may extend in a first direction (e.g., horizontal direction, side-to-side direction, lateral direction, etc.). A Y axis 412 may extend in a second direction (e.g., vertical direction, up and down direction), substantially perpendicular to the first direction. A Z axis 414 may extend in a third direction (e.g., longitudinal direction), substantially perpendicular to the first direction and the second direction. In some embodiments, the third direction may be substantially the same direction as a tool axis extending in a plane substantially perpendicular to a plane of the cross-section (e.g., extending into and out of the page).

The first accelerometer 404 may be configured to measure acceleration in at least two directions, such as a two axis accelerometer. The two directions may be an X axis 422 and a Y axis 424. In some embodiments, the first accelerometer 404 may be a three axis accelerometer (e.g., tri-axial accelerometer). The three directions may be substantially perpendicular to each other. The three directions of the accelerometer may be an X axis 422, a Y axis 424, and a Z axis 426. Similar to the cross-section of the downhole tool 402, the X axis 422 may extend in a first direction substantially parallel to the X axis 410 of the cross-section of the downhole tool 402. The Y axis 424 may extend in a second direction substantially parallel to the Y axis 412 of the cross-section of the downhole tool 402. The Z axis 426 may extend in a third direction substantially parallel to the Z axis 414 of the cross-section of the downhole tool 402. In some embodiments, the first accelerometer 404 may be arranged such that at least one of the axes 422, 424, 426 is substantially coaxial with at least one of the axes 410, 412, 414 of the cross-section of the downhole tool 402. For example, as illustrated in FIG. 4, the Y axis 424 of the first accelerometer 404 may be substantially coaxial with the Y axis 412 of the cross-section of the downhole tool 402.

The first accelerometer 404 may be spaced a distance away from the tool center 408 along the Y axis 412 of the cross-section of the downhole tool 402. The distance may be defined by a first accelerometer radius 428. The first accelerometer radius 428 may be defined by a position of the sensor board 224 coupled to the first accelerometer 404. For example, when the sensor board 224 is mounted into the recess 218 of the downhole tool 402, the recess base 226 and the sensor structure 204 (FIG. 2) may be configured to position the sensor board 224 at a specific distance from the tool center 408, such that the first accelerometer 404 may be positioned at the first accelerometer radius 428.

Each of the X axis 422 and the Z axis 426 of the first accelerometer 404 may be substantially parallel to the corresponding X axis 410 and the Z axis 414 of the cross-section of the downhole tool 402. Each of the X axis 422 and the Z axis 426 may be offset from the corresponding X axis 410 and the Z axis 414 of the cross-section of the downhole tool 402 by about the first accelerometer radius 428.

The second accelerometer 406 may be configured to measure acceleration in at least two directions, such as a two axis accelerometer. The two directions may be an X axis 416 and a Y axis 418. In some embodiments, the second accelerometer 406 may be a three axis accelerometer. The three directions may be substantially perpendicular to each other. The three directions of the accelerometer may be an X axis 416, a Y axis 418, and a Z axis 420. Similar to the cross-section of the downhole tool 402 and the first accelerometer 404, the X axis 416 may extend in a first direction substantially parallel to the X axis 410 of the cross-section of the downhole tool 402 and the X axis 422 of the first accelerometer 404. The Y axis 418 may extend in a second direction substantially parallel to the Y axis 412 of the cross-section of the downhole tool 402 and the Y axis 424 of the first accelerometer 404. The Z axis 420 may extend in a third direction substantially parallel to the Z axis 414 of the cross-section of the downhole tool 402 and the Z axis 426 of the first accelerometer 404. In some embodiments, the second accelerometer 406 may be arranged such that at least one of the axes 416, 418, 420 is substantially coaxial with at least one of the axes 410, 412, 414 of the cross-section of the downhole tool 402. For example, as illustrated in FIG. 4, the Y axis 418 of the second accelerometer 406 may be substantially coaxial with the Y axis 412 of the cross-section of the downhole tool 402. In some embodiments, the second accelerometer 406 may be arranged such that at least one of the axes 416, 418, 420 is substantially coaxial with at least one of the axes 422, 424, 426 of the first accelerometer 404. For example, as illustrated in FIG. 4, the Y axis 418 of the second accelerometer 406 may be substantially coaxial with the Y axis 424 of the first accelerometer 404.

The second accelerometer 406 may be spaced a distance away from the tool center 408 along the Y axis 412 of the cross-section of the downhole tool 402. The distance may be defined by a second accelerometer radius 430. The second accelerometer radius 430 may be defined by a position of the sensor board 224 coupled to the second accelerometer 406. For example, when the sensor board 224 is mounted into the recess 218 of the downhole tool 402, the recess base 226 and the sensor structure 204 (FIG. 2) may be configured to position the sensor board 224 at a specific distance from the tool center 408, such that the second accelerometer 406 may be positioned at the second accelerometer radius 430.

Each of the X axis 416 and the Z axis 420 of the second accelerometer 406 may be substantially parallel to the corresponding X axis 410 and the Z axis 414 of the cross-section of the downhole tool 402 and the corresponding X axis 422 and Z axis 426 of the first accelerometer 404. Each of the X axis 416 and the Z axis 420 may be offset from the corresponding X axis 410 and the Z axis 414 of the cross-section of the downhole tool 402 by about the second accelerometer radius 430.

As described above, rotational acceleration and translational acceleration of the downhole tool 402 may each effect the measurements of the first accelerometer 404 and the second accelerometer 406. The processor may capture the acceleration measurements in each direction from each of the first accelerometer 404 and the second accelerometer 406. In some embodiments, the processor may perform calculations using the measurements from the first accelerometer 404 and the second accelerometer 406 to separate the rotational acceleration from the translational acceleration. For example, the processor may calculate lateral acceleration in the direction defined by the X axes 410, 416, 422 ($A_{xLat}$) according to the following formula:

$$A_{XLat} = \frac{A_{X1} - A_{X2}}{2}$$

In the above formula, "$A_{X1}$" represents the acceleration measurement from the X axis 422 of the first accelerometer 404 and "$A_{X2}$" represents the acceleration measurement from the X axis 416 of the second accelerometer 406.

The processor may calculate lateral acceleration in the direction defined by the Y axes 412, 418, 424 ($A_{YLat}$) according to the following formula:

$$A_{YLat} = \frac{A_{Y1} - A_{Y2}}{2}$$

In the above formula, "$A_{Y1}$" represents the acceleration measurement from the Y axis 424 of the first accelerometer 404 and "$A_{Y2}$" represents the acceleration measurement from the Y axis 418 of the second accelerometer 406.

The processor may calculate an angular acceleration ($A_{ang}$) using the acceleration measurements in from the first accelerometer 404 and the second accelerometer 406 in the respective X axis 422 and X axis 416 directions according to the following formula:

$$A_{ang} = \frac{-A_{X1} - A_{X2}}{2R}$$

In the above formula "$A_{X1}$" represents the acceleration measurement from the X axis 422 of the first accelerometer 404 and $A_{X2}$" represents the acceleration measurement from the X axis 416 of the second accelerometer 406. In the above formula "R" represents the first accelerometer radius 428 and the second accelerometer radius 430 if the first accelerometer radius 428 and the second accelerometer radius 430 are substantially the same.

A tangential acceleration can be obtained by multiplying the angular acceleration with Dy, where Dy represents a radial distance from a center of the downhole tool to a point of interest, such as a sensor location, an outer surface of the downhole tool, etc. Tangential acceleration may be used to determine high frequency torsional oscillation of the downhole tool.

The processor may calculate an square of the angular velocity (w) using the acceleration measurements in from the first accelerometer 404 and the second accelerometer 406 in the respective Y axis 424 and Y axis 418 directions according to the following formula:

$$\omega^2 = \frac{-A_{Y1} - A_{Y2}}{2R}$$

In the above formula "$A_{Y1}$" represents the acceleration measurement from the Y axis 424 of the first accelerometer 404 and "$A_{Y2}$" represents the acceleration measurement from the Y axis 418 of the second accelerometer 406. In the above formula R represents the first accelerometer radius 428 and the second accelerometer radius 430 if the first accelerometer radius 428 and the second accelerometer radius 430 are substantially the same.

The processor may calculate a rotational speed (e.g., rotations per minute (RPM)) using the angular velocity (ω) calculated above. The rotational speed may be calculated according to the following formula:

$$RPM = \frac{60}{2\pi}\omega$$

As discussed above, the self-contained sensor assembly 200 (FIG. 2) may enable the first accelerometer 404 and the second accelerometer 406 to be positioned in a specific orientation and position relative to one another and the downhole tool 402 such that the Y axis 412 of the cross-section of the downhole tool 402, the Y axis 424 of the first accelerometer 404, and the Y axis 418 of the second accelerometer 406 are substantially coaxial. The self-contained sensor assembly 200 may further enable the first accelerometer 404 and the second accelerometer 406 to be positioned in a specific orientation and position relative to one another and the downhole tool 402 such that the X axis 410 of the cross-section of the downhole tool 402, the X axis 422 of the first accelerometer 404, and the X axis 416 of the second accelerometer 406 are in substantially parallel and such that the Z axis 414 of the cross-section of the downhole tool 402, the Z axis 426 of the first accelerometer 404, and the Z axis 420 of the second accelerometer 406 are substantially parallel. In some embodiments, the self-contained sensor assembly 200 may enable the sensor boards 224 to be positioned such that the first accelerometer radius 428 and the second accelerometer radius 430 are substantially the same.

In some embodiments, the sensor boards 224 may each store the accelerometer data from the associated first accelerometer 404 and second accelerometer 406 in a memory device (e.g., memory storage device 308). In some embodiments, the accelerometer data may be retrieved by an external computing device, such as a module, a computer, a tablet, a controller, a server, etc. The external computing device may be configured to perform the calculations discussed above to determine lateral accelerations (e.g., changes in bit tilt angles or azimuth) and angular accelerations (e.g., rotational acceleration, changes in rotational speed, etc.) from the accelerometer data. For example, the lateral and angular accelerations may be calculated and stored in a database including data from the drilling operation. In some embodiments, the database may be used to improve predictability of performance of the drilling operation and/or future drilling operations. In some embodiments, the accelerometer data may be accessed by the external computing device during the drilling operation, such that the data may be used to make operational decisions, such as drilling adjustments, speed adjustments, weight-on-bit (WOB) adjustments, etc. In some embodiments, the accelerometer data may be accessed when the downhole tool 402 is tripped out of the borehole. For example, the accelerometer data may be used to determine adjustments to tooling strategies (e.g., design of the tool, type of tool, tool material, tool arrangement, etc.). In some embodiments, the accelerometer data may be used to determine operational adjustments, such as directional adjustments, stopping points, etc.

In some embodiments, as discussed above the cap 206 may be configured to enable the sensor boards 224 to communicate wirelessly through wireless signals transmitted and/or received through the cap 206 (e.g., through a radio frequency transparent portion of the cap 206). In some embodiments, one of the sensor boards 224 may be configured to be a primary sensor board (e.g., master sensor board, etc.). The primary sensor board may be configured to receive sensor readings from the other sensor board(s) and perform the calculations discussed above to determine lateral accelerations (e.g., changes in bit tilt angles or azimuth) and angular accelerations (e.g., rotational acceleration, changes in rotational speed, etc.).

In some embodiments, the primary sensor board may be configured to transmit a sequencing trigger to the other sensor board(s). For example, the primary sensor board may wirelessly transmit a trigger signal from a time clock coupled to the primary sensor board. In some embodiments, the trigger signal may be configured to synchronize a time clock in the other sensor board(s). In some embodiments, the trigger signal may be configured to cause a processor in the other sensor board(s) to record measurements from the associated accelerometers.

Figure 5:
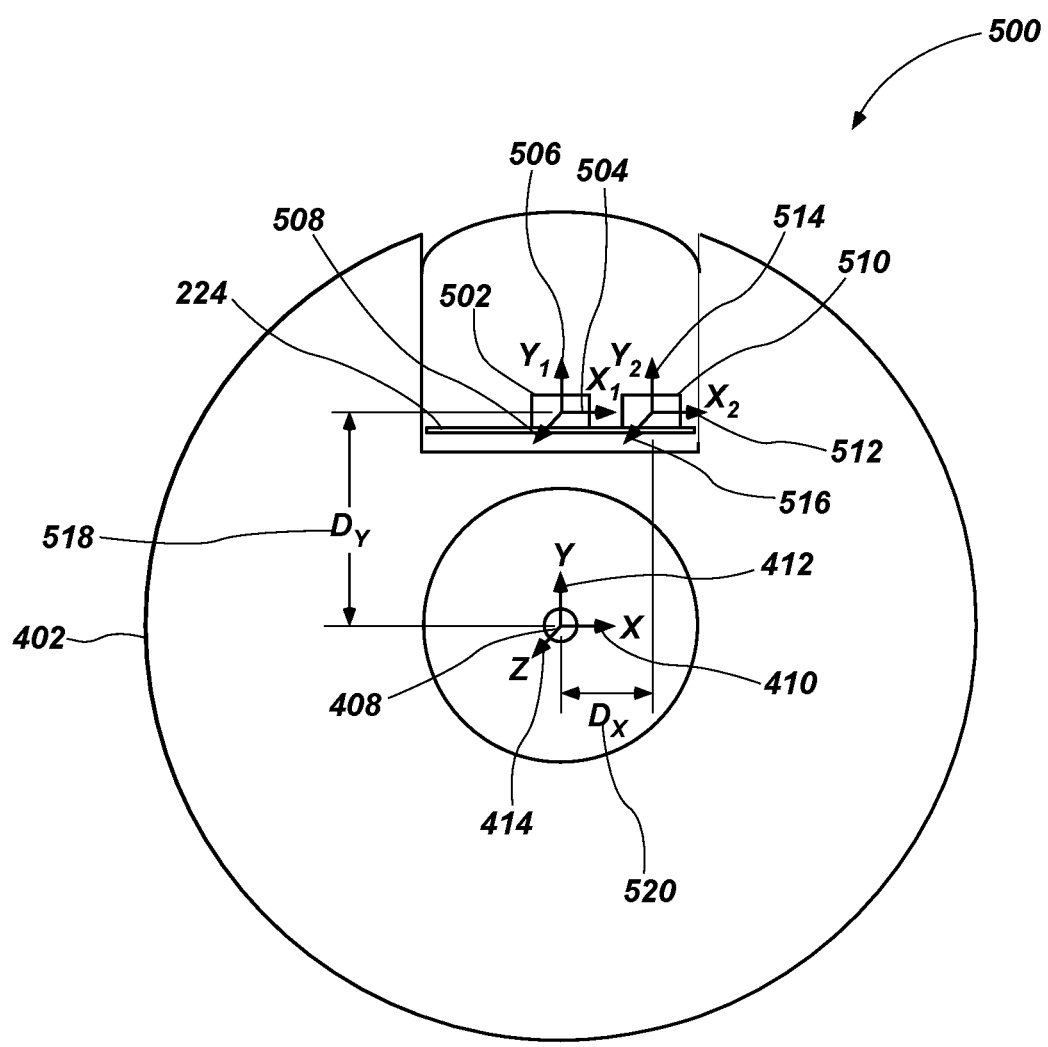
FIG. 5 illustrates a cross-sectional view of a downhole tool having a sensor arrangement according to an embodiment of the present disclosure.

FIG. 5 illustrates an embodiment of a sensor arrangement 500. As illustrated in FIG. 5, the sensor arrangement 500 may include a first accelerometer 502 and a second accelerometer 510. The first accelerometer 502 and the second accelerometer 510 may be coupled to the same sensor board 224.

The first accelerometer 502 may be configured to measure acceleration in at least two directions, such as a two axis accelerometer. The two axes may be an X axis 504 and a Y axis 506. In some embodiments, the first accelerometer 502 may be a three axis accelerometer. The three directions may be substantially perpendicular to each other. The three directions of the accelerometer may be an X axis 504, a Y axis 506, and a Z axis 508. Similar to the cross-section of the downhole tool 402, the X axis 504 may extend in a first direction substantially parallel to the X axis 410 of the cross-section of the downhole tool 402. The Y axis 506 may extend in a second direction substantially parallel to the Y axis 412 of the cross-section of the downhole tool 402. The Z axis 508 may extend in a third direction substantially parallel to the Z axis 414 of the cross-section of the downhole tool 402. In some embodiments, the first accelerometer 502 may be arranged such that at least one of the axes 504, 506, 508 is substantially coaxial with at least one of the axes 410, 412, 414 of the cross-section of the downhole tool 402. For example, as illustrated in FIG. 4, the Y axis 506 of the first accelerometer 502 may be substantially coaxial with the Y axis 412 of the cross-section of the downhole tool 402.

The first accelerometer 502 may be spaced a distance away from the tool center 408 along the Y axis 412 of the cross-section of the downhole tool 402. The distance may be defined as a Y axis displacement 518. The Y axis displacement 518 may be defined by a position of the sensor board 224 coupled to the first accelerometer 502. For example, when the sensor board 224 is mounted into the recess 218 of the downhole tool 402, the recess base 226 and the sensor structure 204 (FIG. 2) may be configured to position the sensor board 224 at a specific distance from the tool center 408, such that the first accelerometer 502 may be positioned at the Y axis displacement 518.

Each of the X axis 504 and the Z axis 508 of the first accelerometer 502 may be substantially parallel to the corresponding X axis 410 and the Z axis 414 of the cross-section of the downhole tool 402. Each of the X axis 504 and the Z axis 508 may be offset from the corresponding X axis 410 and the Z axis 414 of the cross-section of the downhole tool 402 by about the Y axis displacement 518.

The second accelerometer 510 may be configured to measure acceleration in at least two directions, such as a two axis accelerometer. The two axes may be an X axis 512 and a Y axis 514. In some embodiments, the second accelerometer 510 may be a three axis accelerometer. The three directions may be substantially perpendicular to each other. The three directions of the accelerometer may be an X axis 512, a Y axis 514, and a Z axis 516. Similar to the cross-section of the downhole tool 402 and the first accelerometer 502, the X axis 512 may extend in a first direction substantially parallel to the X axis 410 of the cross-section of the downhole tool 402 and the X axis 504 of the first accelerometer 502. The Y axis 514 may extend in a second direction substantially parallel to the Y axis 412 of the cross-section of the downhole tool 402 and the Y axis 506 of the first accelerometer 502. The Z axis 516 may extend in a third direction substantially parallel to the Z axis 414 of the cross-section of the downhole tool 402 and the Z axis 508 of the first accelerometer 502. In some embodiments, the second accelerometer 510 may be arranged such that at least one of the axes 512, 514, 516 is substantially coaxial with at least one of the axes 504, 506, 508 of the first accelerometer 502. For example, as illustrated in FIG. 5, the X axis 512 of the second accelerometer 510 may be substantially coaxial with the X axis 504 of the first accelerometer 502.

The second accelerometer 510 may be spaced a distance away from the tool center 408 in a direction of the Y axis 412 of the cross-section of the downhole tool 402. The distance may be defined by the Y axis displacement 518. The second accelerometer 510 may be coupled to the same sensor board 224 as the first accelerometer 502, such that the second accelerometer 510 may be positioned in substantially a same plane as the first accelerometer 502 (e.g., having the same Y axis displacement 518 in the direction of the Y axis 412 from the tool center 408). The second accelerometer 510 may be positioned a distance from the first accelerometer 502 in a direction of the X axis 504 of the first accelerometer 502. The distance may define an X axis displacement 520 between the first accelerometer 502 and the second accelerometer 510. As described above, the first accelerometer 502 may be substantially coaxial with the Y axis 412 of the cross-section of the downhole tool 402. Thus, the X axis 410 may also be displaced from the tool center 408 in a direction of the X axis 410 of the cross-section of the downhole tool 402 by the X axis displacement 520. Differences between the acceleration measurements of the first accelerometer 502 and the second accelerometer 510 may increase as the X axis displacement 520 increases. In some embodiments, the second accelerometer 510 may be positioned at the greatest X axis displacement 520 made possible by the sensor board 224. For example, the first accelerometer 502 may be positioned substantially at a center of the sensor board 224 and the second accelerometer 510 may be positioned at or near an outer edge of the sensor board 224, such that the X axis displacement 520 is substantially the same as a radius of the sensor board 224.

Each of the X axis 512, the Y axis 514, and the Z axis 516 of the second accelerometer 510 may be substantially parallel to the corresponding X axis 410, Y axis 412, and Z axis 414 of the cross-section of the downhole tool 402 and the corresponding X axis 504, Y axis 506, and Z axis 508 of the first accelerometer 502. Each of the Y axis 514 and the Z axis 516 may be offset from the corresponding Y axis 506 and the Z axis 508 of the first accelerometer 502 by about the X axis displacement 520. Similarly, each of the Y axis 514 and the Z axis 516 may be offset from the corresponding Y axis 412 and the Z axis 414 of the cross-section of the downhole tool 402 by about the X axis displacement 520.

As described above, rotational acceleration and translational acceleration of the downhole tool 402 may each effect the measurements of the first accelerometer 502 and the second accelerometer 510. The processor may capture the acceleration measurements in each direction from each of the first accelerometer 502 and the second accelerometer 510. In some embodiments, the processor may perform calculations using the measurements from the first accelerometer 502 and the second accelerometer 510 to separate the rotational acceleration from the translational acceleration. For example, the processor may calculate lateral acceleration in the direction defined by the X axes 410, 504, 512 ($A_{xLat}$) according to the following formula:

$$A_{XLat} = \frac{D_X A_{X1} - D_Y A_{Y1} + D_Y A_{Y2}}{D_X}$$

In the above formula, "$A_{X1}$" represents the acceleration measurement from the X axis 504 of the first accelerometer 502. "$A_{Y1}$" represents the acceleration measurement from the Y axis 506 of the first accelerometer 502 and "$A_{Y2}$" represents the acceleration measurement from the Y axis 514 of the second accelerometer 510. "$D_X$" represents the X axis displacement 520 of the second accelerometer 510 and "$D_Y$" represents the Y axis displacement 518 of both of the first accelerometer 502 and the second accelerometer 510 from the tool center 408.

The processor may calculate lateral acceleration in the direction defined by the Y axes 412, 506, 514 ($A_{YLat}$) according to the following formula:

$$A_{YLat} = \frac{D_X A_{Y1} + D_Y A_{X1} - D_Y A_{X2}}{D_X}$$

In the above formula, "$A_{X1}$" represents the acceleration measurement from the X axis 504 of the first accelerometer 502 and "$A_{X2}$" represents the acceleration measurement from the X axis 512 of the second accelerometer 510. "$A_{Y1}$" represents the acceleration measurement from the Y axis 506 of the first accelerometer 502. "$D_X$" represents the X axis displacement 520 of the second accelerometer 510 and "$D_Y$" represents the Y axis displacement 518 of both of the first accelerometer 502 and the second accelerometer 510 from the tool center 408.

The processor may calculate an angular acceleration ($A_{ang}$) using the acceleration measurements from the first accelerometer 502 and the second accelerometer 510 in the respective Y axis 506 and Y axis 514 directions according to the following formula:

$$A_{ang} = \frac{A_{Y2} - A_{Y1}}{D_X}$$

In the above formula, "$A_{Y1}$" represents the acceleration measurement from the Y axis 506 of the first accelerometer 502 and "$A_{Y2}$" represents the acceleration measurement from the Y axis 514 of the second accelerometer 510. "$D_X$" represents the X axis displacement 520 of the second accelerometer 510.

A tangential acceleration can be obtained by multiplying the angular acceleration with Dy, where Dy represents a radial distance from a center of the downhole tool to a point of interest, such as a sensor location, an outer surface of the downhole tool, etc. Tangential acceleration may be used to determine high frequency torsional oscillation of the downhole tool.

The processor may calculate a square of the angular velocity ($\omega$) using the acceleration measurements in from the first accelerometer 502 and the second accelerometer 510 in the respective X axis 504 and X axis 512 directions according to the following formula:

$$\omega^2 = \frac{A_{X1} - A_{X2}}{D_X}$$

In the above formula, "$A_{X1}$" represents the acceleration measurement from the X axis 504 of the first accelerometer 502 and "$A_{X2}$" represents the acceleration measurement from the X axis 512 of the second accelerometer 510. "$D_X$" represents the X axis displacement 520 of the second accelerometer 510.

The processor may calculate a rotational speed (e.g., rotations per minute (RPM)) using the angular velocity ($\omega$) calculated above. The rotational speed may be calculated according to the following formula:

$$RPM = \frac{60}{2\pi}\omega$$

As discussed above, the self-contained sensor assembly 200 (FIG. 2) may enable the sensor board 224 to be positioned in a specific orientation and position relative to the downhole tool 402 such that the Y axis 412 of the cross-section of the downhole tool 402, the Y axis 506 of the first accelerometer 502 are substantially coaxial. The first accelerometer 502 and the second accelerometer 510 may be positioned on the sensor board 224 in a specific orientation and position relative to one another and the downhole tool 402 such that the X axis 410 of the cross-section of the downhole tool 402, the X axis 504 of the first accelerometer 502, and the X axis 512 of the second accelerometer 510 are substantially parallel and such that the Z axis 414 of the cross-section of the downhole tool 402, the Z axis 508 of the first accelerometer 502, and the Z axis 516 of the second accelerometer 510 are substantially parallel. The position of the first accelerometer 502 and the second accelerometer 510 on the sensor board 224 may define the X axis displacement 520 and the position of the sensor board 224 as determined by the self-contained sensor assembly 200 (FIG. 2) may define the Y axis displacement 518.

In some embodiments, the sensor board 224 may store the accelerometer data from the first accelerometer 502 and second accelerometer 510 in a memory device. In some embodiments, the accelerometer data may be retrieved by an external computing device. The external computing device may be configured to perform the calculations discussed above to determine lateral accelerations (e.g., changes in bit tilt angles or azimuth) and angular accelerations (e.g., rotational acceleration, changes in rotational speed, etc.) from the accelerometer data. For example, the lateral and angular accelerations may be calculated and stored in a database including data from the drilling operation. In some embodiments, the database may be used to improve predictability of performance of the drilling operation and/or future drilling operations. In some embodiments, the accelerometer data may be accessed by the external computing device during the drilling operation, such that the data may be used to make operational decisions, such as drilling adjustments, speed adjustments, weight-on-bit (WOB) adjustments, etc. In some embodiments, the accelerometer data may be accessed when the downhole tool 402 is tripped out of the borehole. For example, the accelerometer data may be used to determine adjustments to tooling strategies (e.g., design of the tool, type of tool, tool material, tool arrangement, etc.). In some embodiments, the accelerometer data may be used to determine operational adjustments, such as directional adjustments, stopping points, etc.

In some embodiments, a processor on the sensor board 224 may be configured to perform the calculations discussed above to determine lateral accelerations and angular accelerations from the accelerometer data. In some embodiments, the lateral accelerations and angular accelerations may be stored in a memory device to be retrieved when the downhole tool 402 is tripped out of the borehole. In some embodiments, the processor may be configured to transmit the calculated values through wireless or wired connections to other components in the drill string. For example, a control module may be configured to receive the acceleration calculations and adjust control parameters of the drill string based on the acceleration calculations. In some embodiments, the acceleration calculations may be transmitted to an operator at the surface, such that the operator may make operational decisions based on the acceleration calculations.

Figure 6:
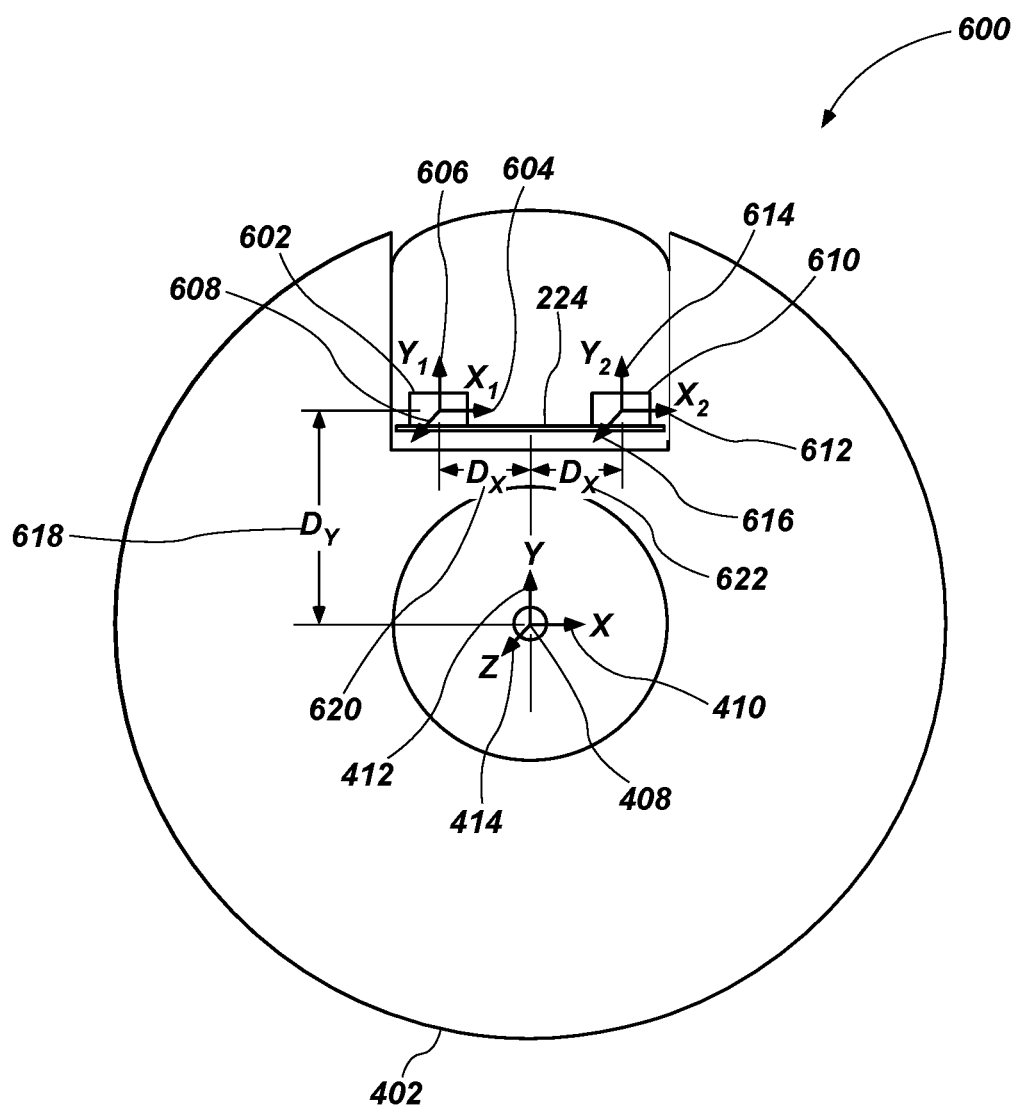
FIG. 6 illustrates a cross-sectional view of a downhole tool having a sensor arrangement according to an embodiment of the present disclosure.

FIG. 6 illustrates an embodiment of a sensor arrangement 600. As illustrated in FIG. 6, the sensor arrangement 600 may include a first accelerometer 602 and a second accelerometer 610. The first accelerometer 602 and the second accelerometer 610 may be coupled to the same sensor board 224.

The first accelerometer 602 may be configured to measure acceleration in at least two directions, such as a two axis accelerometer. The two axes may be an X axis 604 and a Y axis 606. In some embodiments, the first accelerometer 602 may be a three axis accelerometer. The three directions may be substantially perpendicular to each other. The three directions of the accelerometer may be an X axis 604, a Y axis 606, and a Z axis 608. Similar to the cross-section of the downhole tool 402, the X axis 604 may extend in a first direction substantially parallel to the X axis 410 of the cross-section of the downhole tool 402. The Y axis 606 may extend in a second direction substantially parallel to the Y axis 412 of the cross-section of the downhole tool 402. The Z axis 608 may extend in a third direction substantially parallel to the Z axis 414 of the cross-section of the downhole tool 402.

The second accelerometer 610 may be configured to measure acceleration in at least two directions, such as a two axis accelerometer. The two axes may be an X axis 612 and a Y axis 614. In some embodiments, the second accelerometer 610 may be a three axis accelerometer. The three directions may be substantially perpendicular to each other. The three directions of the accelerometer may be an X axis 612, a Y axis 614, and a Z axis 616. Similar to the cross-section of the downhole tool 402 and the first accelerometer 602, the X axis 612 may extend in a first direction substantially parallel to the X axis 410 of the cross-section of the downhole tool 402 and the X axis 604 of the first accelerometer 602. The Y axis 614 may extend in a second direction substantially parallel to the Y axis 412 of the cross-section of the downhole tool 402 and the Y axis 606 of the first accelerometer 602. The Z axis 616 may extend in a third direction substantially parallel to the Z axis 414 of the cross-section of the downhole tool 402 and the Z axis 608 of the first accelerometer 602. In some embodiments, the second accelerometer 610 may be arranged such that at least one of the axes 612, 614, 616 is substantially coaxial with at least one of the axes 604, 606, 608 of the first accelerometer 602. For example, as illustrated in FIG. 6, the X axis 612 of the second accelerometer 610 may be substantially coaxial with the X axis 604 of the first accelerometer 602.

The first accelerometer 502 and the second accelerometer 610 may be spaced a distance away from the tool center 408 along the Y axis 412 of the cross-section of the downhole tool 402. The distance may be defined as a Y axis displacement 618. The Y axis displacement 618 may be defined by a position of the sensor board 224 coupled to the first accelerometer 602 and the second accelerometer 610. For example, when the sensor board 224 is mounted into the recess 218 of the downhole tool 402, the recess base 226 and the sensor structure 204 (FIG. 2) may be configured to position the sensor board 224 at a specific distance from the tool center 408, such that the first accelerometer 602 and the second accelerometer 610 may be positioned at the Y axis displacement 618.

Each of the X axis 604, the Y axis 606, and the Z axis 608 of the first accelerometer 602 may be substantially parallel to the corresponding X axis 410 and the Z axis 414 of the cross-section of the downhole tool 402. Each of the X axis 612, the Y axis 614, and the Z axis 616 of the second accelerometer 610 may be substantially parallel to the corresponding X axis 410 and the Z axis 414 of the cross-section of the downhole tool 402 and may be substantially parallel to the corresponding X axis 604, Y axis 606, and Z axis 608 of the first accelerometer 602. Each of the X axis 604 and the X axis 612 of the respective first accelerometer 602 and the second accelerometer 610 may be spaced from the X axis 410 of the cross-section of the downhole tool 402 by about the Y axis displacement 618. Similarly, each of the Z axis 608 and the Z axis 616 of the respective first accelerometer 602 and the second accelerometer 610 may be spaced from the Z axis 414 of the cross-section of the downhole tool 402 by about the Y axis displacement 618.

The first accelerometer 602 and the second accelerometer 610 may be positioned a distance from the Y axis 412 of the cross-section of the downhole tool 402 in a direction of the X axis 410 of the cross-section of the downhole tool 402. The first accelerometer 602 and the second accelerometer 610 may be displaced from the Y axis 412 of the cross-section of the downhole tool 402 in opposite directions along the X axis 410 of the cross-section of the downhole tool 402. The distance between the Y axis 412 of the cross-section of the downhole tool 402 and the first accelerometer 602 may define a first accelerometer X axis displacement 620. The distance between the Y axis 412 of the cross-section of the downhole tool 402 and the second accelerometer 610 may define a second accelerometer X axis displacement 622. In some embodiments, the first accelerometer X axis displacement 620 and the second accelerometer X axis displacement 622 may be substantially the same distance in opposite directions from the Y axis 412 of the cross-section of the downhole tool 402. As the first accelerometer X axis displacement 620 and the second accelerometer X axis displacement 622 increase the differences between the accelerations measured by the respective first accelerometer 602 and second accelerometer 610 may increase. In some embodiments, the first accelerometer 602 and the second accelerometer 610 may be positioned substantially at opposite edges of the sensor board 224, such that the first accelerometer X axis displacement 620 and the second accelerometer X axis displacement 622 are substantially the same as a radius of the sensor board 224.

Each of the X axis 604, the Y axis 606, and the Z axis 608 of the first accelerometer 602 may be substantially parallel to the corresponding X axis 612, Y axis 614, and Z axis 616 of the second accelerometer 510. Similarly, each of the X axis 604, X axis 612, Y axis 606, Y axis 614, Z axis 608, and Z axis 616 of the respective first accelerometer 602 and second accelerometer 610 may be substantially parallel to the corresponding X axis 410, Y axis 412, and Z axis 414 of the cross-section of the downhole tool 402. Each of the Y axis 606 and the Z axis 608 of the first accelerometer 602 may be offset from the corresponding Y axis 412 and the Z axis 414 of the cross-section of the downhole tool 402 by about the first accelerometer X axis displacement 620 in a direction of the X axis 410 of the cross-section of the downhole tool 402. Similarly, each of the Y axis 614 and the Z axis 616 of the second accelerometer 610 may be offset from the corresponding Y axis 412 and the Z axis 414 of the cross-section of the downhole tool 402 by about the second accelerometer X axis displacement 622 in a direction of the X axis 410 of the cross-section of the downhole tool 402 opposite the first accelerometer X axis displacement 620.

As described above, rotational acceleration and translational acceleration of the downhole tool 402 may each effect the measurements of the first accelerometer 602 and the second accelerometer 610. The processor may capture the acceleration measurements in each direction from each of the first accelerometer 602 and the second accelerometer 610. In some embodiments, the processor may perform calculations using the measurements from the first accelerometer 602 and the second accelerometer 610 to separate the rotational acceleration from the translational acceleration. For example, the processor may calculate lateral acceleration in the direction defined by the X axes 410, 604, 612 ($A_{xLat}$) according to the following formula:

$$A_{XLat} = \frac{D_X A_{X1} + D_X A_{X2} - D_Y A_{Y1} + D_Y A_{Y2}}{2D_X}$$

In the above formula, "$A_{X1}$" represents the acceleration measurement from the X axis 604 of the first accelerometer 602 and "$A_{X2}$" represents the acceleration measurement from the X axis 612 of the second accelerometer 610. "$A_{Y1}$" represents the acceleration measurement from the Y axis 606 of the first accelerometer 602 and "$A_{Y2}$" represents the acceleration measurement from the Y axis 614 of the second accelerometer 610. "$D_X$" represents the first accelerometer X axis displacement 620 and the second accelerometer X axis displacement 622, wherein each of the first accelerometer X axis displacement 620 and the second accelerometer X axis displacement 622 are substantially the same and "$D_Y$" represents the Y axis displacement 618 of both of the first accelerometer 602 and the second accelerometer 610 from the tool center 408.

The processor may calculate lateral acceleration in the direction defined by the Y axes 412, 606, 614 ($A_{YLat}$) according to the following formula:

$$A_{YLat} = \frac{D_X A_{Y1} + D_X A_{Y2} + D_Y A_{X1} - D_Y A_{X2}}{2D_X}$$

In the above formula, "$A_{X1}$" represents the acceleration measurement from the X axis 604 of the first accelerometer 602 and "$A_{X2}$" represents the acceleration measurement from the X axis 612 of the second accelerometer 610. "$A_{Y1}$" represents the acceleration measurement from the Y axis 606 of the first accelerometer 602 and "$A_{Y2}$" represents the acceleration measurement from the Y axis 614 of the second accelerometer 610. "$D_X$" represents the first accelerometer X axis displacement 620 and the second accelerometer X axis displacement 622, wherein each of the first accelerometer X axis displacement 620 and the second accelerometer X axis displacement 622 are substantially the same and "$D_Y$" represents the Y axis displacement 618 of both of the first accelerometer 602 and the second accelerometer 610 from the tool center 408.

The processor may calculate an angular acceleration ($A_{ang}$) using the acceleration measurements from the first accelerometer 602 and the second accelerometer 610 in the respective Y axis 606 and Y axis 614 directions according to the following formula:

$$A_{ang} = \frac{A_{Y2} - A_{Y1}}{2D_X}$$

In the above formula, "$A_{Y1}$" represents the acceleration measurement from the Y axis 606 of the first accelerometer 602 and "$A_{Y2}$" represents the acceleration measurement from the Y axis 614 of the second accelerometer 610. "$D_X$" represents the first accelerometer X axis displacement 620 and the second accelerometer X axis displacement 622, wherein each of the first accelerometer X axis displacement 620 and the second accelerometer X axis displacement 622 are substantially the same.

A tangential acceleration can be obtained by multiplying the angular acceleration with Dy, where Dy represents a radial distance from a center of the downhole tool to a point of interest, such as a sensor location, an outer surface of the downhole tool, etc. Tangential acceleration may be used to determine high frequency torsional oscillation of the downhole tool.

The processor may calculate a square of the angular velocity (ω) using the acceleration measurements in from the first accelerometer 602 and the second accelerometer 610 in the respective X axis 604 and X axis 612 directions according to the following formula:

$$\omega^2 = \frac{A_{X1} - A_{X2}}{2D_X}$$

In the above formula, "$A_{X1}$" represents the acceleration measurement from the X axis 604 of the first accelerometer 602 and "$A_{X2}$" represents the acceleration measurement from the X axis 612 of the second accelerometer 610. "$D_X$" represents the first accelerometer X axis displacement 620 and the second accelerometer X axis displacement 622, wherein each of the first accelerometer X axis displacement 620 and the second accelerometer X axis displacement 622 are substantially the same.

The processor may calculate a rotational speed (e.g., rotations per minute (RPM)) using the angular velocity (ω) calculated above. The rotational speed may be calculated according to the following formula:

$$RPM = \frac{60}{2\pi}\omega$$

As discussed above, the self-contained sensor assembly 200 (FIG. 2) may enable the sensor board 224 to be positioned in a specific orientation and position relative to the downhole tool 402 such that the X axis 604, X axis 612, Y axis 606, Y axis 614, Z axis 608, and Z axis 616 of the respective first accelerometer 602 and second accelerometer 610 are substantially parallel to the corresponding X axis 410, Y axis 412, and Z axis 414 of the cross-section of the downhole tool 402. The position of the first accelerometer 602 and the second accelerometer 610 on the sensor board 224 may define the first accelerometer X axis displacement 620 and the second accelerometer X axis displacement 622 and the position of the sensor board 224 as determined by the self-contained sensor assembly 200 (FIG. 2) may define the Y axis displacement 618.

In some embodiments, the sensor board 224 may store the accelerometer data from the first accelerometer 602 and second accelerometer 610 in a memory device. In some embodiments, the accelerometer data may be retrieved by an external computing device. The external computing device may be configured to perform the calculations discussed above to determine lateral accelerations (e.g., changes in bit tilt angles or azimuth) and angular accelerations (e.g., rotational acceleration, changes in rotational speed, etc.) from the accelerometer data. For example, the lateral and angular accelerations may be calculated and stored in a database including data from the drilling operation. In some embodiments, the database may be used to improve predictability of performance of the drilling operation and/or future drilling operations. In some embodiments, the accelerometer data may be accessed by the external computing device during the drilling operation, such that the data may be used to make operational decisions, such as drilling adjustments, speed adjustments, weight-on-bit (WOB) adjustments, etc. In some embodiments, the accelerometer data may be accessed when the downhole tool 402 is tripped out of the borehole. For example, the accelerometer data may be used to determine adjustments to tooling strategies (e.g., design of the tool, type of tool, tool material, tool arrangement, etc.). In some embodiments, the accelerometer data may be used to determine operational adjustments, such as directional adjustments, stopping points, etc.

In some embodiments, a processor on the sensor board 224 may be configured to perform the calculations discussed above to determine lateral accelerations and angular accelerations from the accelerometer data. In some embodiments, the lateral accelerations and angular accelerations may be stored in a memory device to be retrieved when the downhole tool 402 is tripped out of the borehole. In some embodiments, the processor may be configured to transmit the calculated values through wireless or wired connections to other components in the drill string. For example, a control module may be configured to receive the acceleration calculations and adjust control parameters of the drill string based on the acceleration calculations. In some embodiments, the acceleration calculations may be transmitted to an operator at the surface, such that the operator may make operational decisions based on the acceleration calculations.

Figure 7:
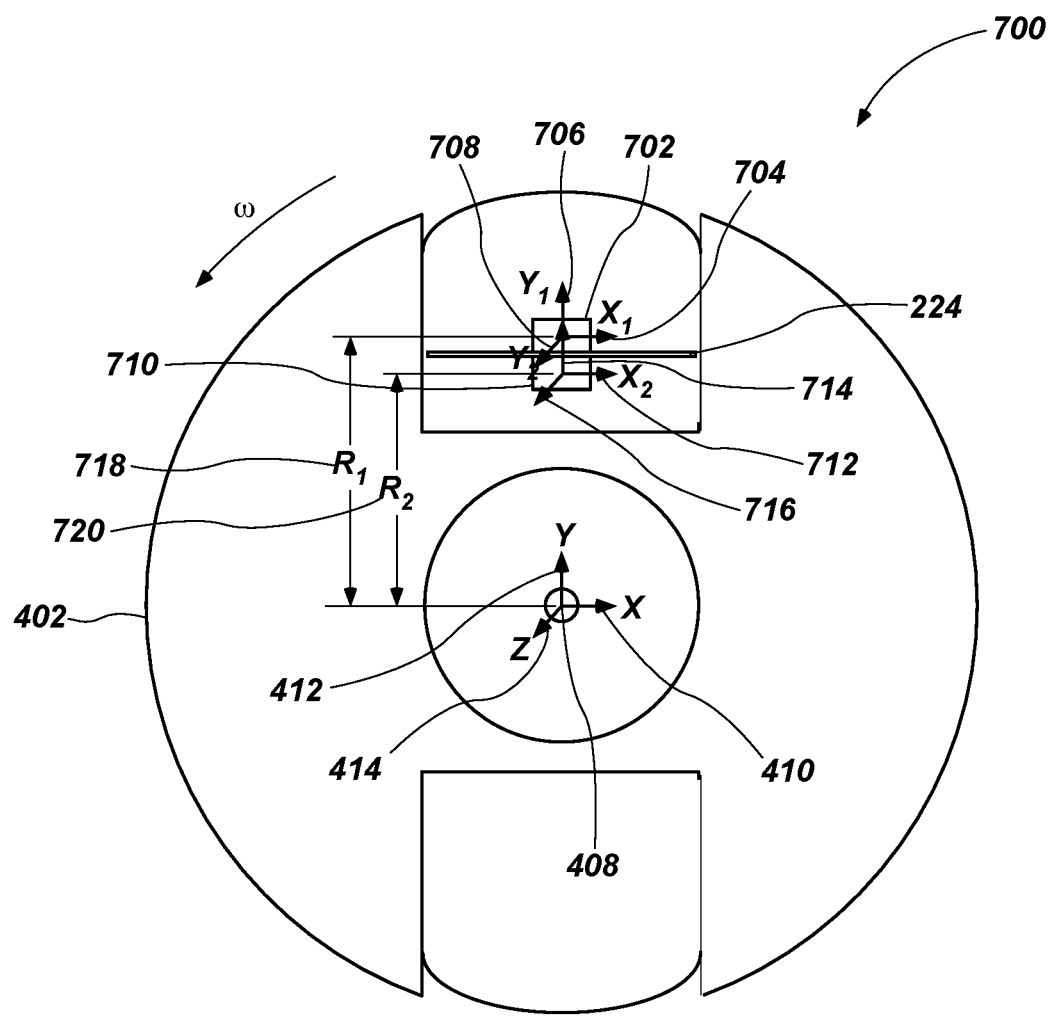
FIG. 7 illustrates a cross-sectional view of a downhole tool having a sensor arrangement according to an embodiment of the present disclosure.

FIG. 7 illustrates an embodiment of a sensor arrangement 700. As illustrated in FIG. 7, the sensor arrangement 700 may include a first accelerometer 702 and a second accelerometer 710. The first accelerometer 702 and the second accelerometer 710 may be coupled to the same sensor board 224.

The first accelerometer 702 may be configured to measure acceleration in at least two directions, such as a two axis accelerometer. The two axes may be an X axis 704 and a Y axis 706. In some embodiments, the first accelerometer 702 may be a three axis accelerometer. The three directions may be substantially perpendicular to each other. The three directions of the accelerometer may be an X axis 704, a Y axis 706, and a Z axis 708. Similar to the cross-section of the downhole tool 402, the X axis 704 may extend in a first direction substantially parallel to the X axis 410 of the cross-section of the downhole tool 402. The Y axis 706 may extend in a second direction substantially parallel to the Y axis 412 of the cross-section of the downhole tool 402. The Z axis 708 may extend in a third direction substantially parallel to the Z axis 414 of the cross-section of the downhole tool 402.

The second accelerometer 710 may be configured to measure acceleration in at least two directions, such as a two axis accelerometer. The two axes may be an X axis 712 and a Y axis 714. In some embodiments, the second accelerometer 710 may be a three axis accelerometer. The three directions may be substantially perpendicular to each other. The three directions of the accelerometer may be an X axis 712, a Y axis 714, and a Z axis 716. Similar to the cross-section of the downhole tool 402 and the first accelerometer 702, the X axis 712 may extend in a first direction substantially parallel to the X axis 410 of the cross-section of the downhole tool 402 and the X axis 704 of the first accelerometer 702. The Y axis 714 may extend in a second direction substantially parallel to the Y axis 412 of the cross-section of the downhole tool 402 and the Y axis 706 of the first accelerometer 702. The Z axis 716 may extend in a third direction substantially parallel to the Z axis 414 of the cross-section of the downhole tool 402 and the Z axis 708 of the first accelerometer 702. In some embodiments, the second accelerometer 710 may be arranged such that at least one of the axes 712, 714, 716 is substantially coaxial with at least one of the axes 704, 706, 708 of the first accelerometer 702. For example, as illustrated in FIG. 7, the Y axis 714 of the second accelerometer 710 may be substantially coaxial with the Y axis 706 of the first accelerometer 702. In some embodiments, each of the first accelerometer 702 and the second accelerometer 710 may be arranged such that the coaxial axes 706, 714 are also substantially coaxial with at least one axis 410, 412, 414 of the cross-section of the downhole tool 402. For example, each of the Y axis 706, Y axis 714, and Y axis 412 may be substantially coaxial, as illustrated in FIG. 7.

The first accelerometer 702 and the second accelerometer 710 may be spaced different distances away from the tool center 408 along the Y axis 412 of the cross-section of the downhole tool 402. The distances may be defined as a first accelerometer Y axis displacement 718 and a second accelerometer Y axis displacement 720. The first accelerometer Y axis displacement 718 and the second accelerometer Y axis displacement 720 may be defined by a combination of a position of the sensor board 224 coupled to the first accelerometer 702 and the second accelerometer 710 and a position of the first accelerometer 702 and the second accelerometer 710 relative to the sensor board 224. For example, when the sensor board 224 is mounted into the recess 218 of the downhole tool 402, the recess base 226 and the sensor structure 204 (FIG. 2) may be configured to position the sensor board 224 at a specific distance from the tool center 408. In some embodiments, the first accelerometer 702 may be coupled to a first side of the sensor board 224 and the second accelerometer 710 may be coupled to a second opposite side of the sensor board 224 as illustrated in FIG. 7. In some embodiments, one or more of the first accelerometer 702 and the second accelerometer 710 may include features such as standoffs configured to change a distance between the first accelerometer 702 and/or the second accelerometer 710 and the sensor board 224. As a difference between the first accelerometer Y axis displacement 718 and the second accelerometer Y axis displacement 720 increases a difference between the measured accelerations of the respective first accelerometer 702 and second accelerometer 710 may increase. In some embodiments, one or more of the first accelerometer 702 and the second accelerometer 710 may be mounted separate from the sensor board 224, such as within the body of the downhole tool 402. For example, the second accelerometer 710 may be mounted substantially at the tool center 408, such that the second accelerometer Y axis displacement 720 is substantially zero and a difference between the first accelerometer Y axis displacement 718 and the second accelerometer Y axis displacement 720 is substantially the first accelerometer Y axis displacement 718.

Each of the X axis 704 and the Z axis 708 of the first accelerometer 702 may be substantially parallel to the corresponding X axis 410 and the Z axis 414 of the cross-section of the downhole tool 402. Each of the X axis 712 and the Z axis 716 of the second accelerometer 710 may be substantially parallel to the corresponding X axis 410 and the Z axis 414 of the cross-section of the downhole tool 402 and may be substantially parallel to the corresponding X axis 704 and Z axis 708 of the first accelerometer 702. Each of the X axis 704 and the Z axis 708 of the first accelerometer 602 may be spaced from the corresponding X axis 410 and Z axis 414 of the cross-section of the downhole tool 402 by about the first accelerometer Y axis displacement 718. Similarly, each of the X axis 712 and the Z axis 716 of the second accelerometer 710 may be spaced from the X axis 410 and the Z axis 414 of the cross-section of the downhole tool 402 by about the second accelerometer Y axis displacement 720.

As described above, rotational acceleration and translational acceleration of the downhole tool 402 may each effect the measurements of the first accelerometer 702 and the second accelerometer 710. The processor may capture the acceleration measurements in each direction from each of the first accelerometer 702 and the second accelerometer 710. In some embodiments, the processor may perform calculations using the measurements from the first accelerometer 702 and the second accelerometer 710 to separate the rotational acceleration from the translational acceleration. For example, the processor may calculate lateral acceleration in the direction defined by the X axes 410, 704, 712 ($A_{xLat}$) according to the following formula:

$$A_{XLat} = \frac{R_1 A_{X2} - R_2 A_{X1}}{R_1 - R_2}$$

In the above formula, "$A_{X1}$" represents the acceleration measurement from the X axis 704 of the first accelerometer 702 and "$A_{X2}$" represents the acceleration measurement from the X axis 712 of the second accelerometer 710. "$R_1$" represents the first accelerometer Y axis displacement 718 of the first accelerometer 702 from the tool center 408 and "$R_2$" represents the second accelerometer Y axis displacement 720 of the second accelerometer 710 from the tool center 408.

The processor may calculate lateral acceleration in the direction defined by the Y axes 412, 706, 714 ($A_{YLat}$) according to the following formula:

$$A_{YLat} = \frac{R_1 A_{Y2} - R_2 A_{Y1}}{R_1 - R_2}$$

In the above formula, "$A_{Y1}$" represents the acceleration measurement from the Y axis 706 of the first accelerometer 702 and "$A_{Y2}$" represents the acceleration measurement from the Y axis 714 of the second accelerometer 710. "$R_1$" represents the first accelerometer Y axis displacement 718 of the first accelerometer 702 from the tool center 408 and "$R_2$" represents the second accelerometer Y axis displacement 720 of the second accelerometer 710 from the tool center 408.

The processor may calculate an angular acceleration ($A_{ang}$) using the acceleration measurements from the first accelerometer 702 and the second accelerometer 710 in the respective X axis 704 and X axis 712 directions according to the following formula:

$$A_{ang} = \frac{A_{X2} - A_{X1}}{R_1 - R_2}$$

In the above formula, "$A_{X1}$" represents the acceleration measurement from the X axis 704 of the first accelerometer 702 and "$A_{X2}$" represents the acceleration measurement from the X axis 712 of the second accelerometer 710. "$R_1$" represents the first accelerometer Y axis displacement 718 of the first accelerometer 702 from the tool center 408 and "$R_2$" represents the second accelerometer Y axis displacement 720 of the second accelerometer 710 from the tool center 408.

A tangential acceleration can be obtained by multiplying the angular acceleration with Dy, where Dy represents a radial distance from a center of the downhole tool to a point of interest, such as a sensor location, an outer surface of the downhole tool, etc. Tangential acceleration may be used to determine high frequency torsional oscillation of the downhole tool.

The processor may calculate a square of the angular velocity (ω) using the acceleration measurements in from the first accelerometer 702 and the second accelerometer 710 in the respective Y axis 706 and Y axis 714 directions according to the following formula:

$$\omega^2 = \frac{A_{Y2} - A_{Y1}}{R_1 - R_2}$$

In the above formula, "$A_{Y1}$" represents the acceleration measurement from the Y axis 706 of the first accelerometer 702 and "$A_{Y2}$" represents the acceleration measurement from the Y axis 714 of the second accelerometer 710. "$R_1$" represents the first accelerometer Y axis displacement 718 of the first accelerometer 702 from the tool center 408 and "$R_2$" represents the second accelerometer Y axis displacement 720 of the second accelerometer 710 from the tool center 408.

The processor may calculate a rotational speed (e.g., rotations per minute (RPM)) using the angular velocity (ω) calculated above. The rotational speed may be calculated according to the following formula:

$$RPM = \frac{60}{2\pi}\omega$$

As discussed above, the self-contained sensor assembly 200 (FIG. 2) may enable the sensor board 224 to be positioned in a specific orientation and position relative to the downhole tool 402 such that the Y axis 706 and Y axis 714 of the respective first accelerometer 702 and second accelerometer 710 are substantially coaxial with the Y axis 412 of the cross-section of the downhole tool 402. The self-contained sensor assembly 200 may also enable the sensor board 224 to be positioned such that the X axis 704, X axis 712, Z axis 708, and Z axis 716 of the respective first accelerometer 702 and second accelerometer 710 are substantially parallel to the corresponding X axis 410, Y axis 412, and Z axis 414 of the cross-section of the downhole tool 402. The position of the sensor board 224 as determined by the self-contained sensor assembly 200 (FIG. 2) along with mounting configurations of the first accelerometer 702 and the second accelerometer 710 may define the first accelerometer Y axis displacement 718 and the second accelerometer Y axis displacement 720.

In some embodiments, the sensor board 224 may store the accelerometer data from the first accelerometer 702 and second accelerometer 710 in a memory device (e.g., memory storage device 308). In some embodiments, the accelerometer data may be retrieved by an external computing device, such as a module, a computer, a tablet, a controller, a server, etc. The external computing device may be configured to perform the calculations discussed above to determine lateral accelerations (e.g., changes in bit tilt angles or azimuth) and angular accelerations (e.g., rotational acceleration, changes in rotational speed, etc.) from the accelerometer data. For example, the lateral and angular accelerations may be calculated and stored in a database including data from the drilling operation. In some embodiments, the database may be used to improve predictability of performance of the drilling operation and/or future drilling operations. In some embodiments, the accelerometer data may be accessed by the external computing device during the drilling operation, such that the data may be used to make operational decisions, such as drilling adjustments, speed adjustments, weight-on-bit (WOB) adjustments, etc. In some embodiments, the accelerometer data may be used to determine dynamics of parameters of the stability of a drill bit. In some embodiments, the accelerometer data may be accessed when the downhole tool 402 is tripped out of the borehole. For example, the accelerometer data may be used to determine adjustments to tooling strategies (e.g., design of the tool, type of tool, tool material, tool arrangement, etc.). In some embodiments, the accelerometer data may be used to determine operational adjustments, such as directional adjustments, stopping points, etc.

In some embodiments, a processor (e.g., processor 306) on the sensor board 224 may be configured to perform the calculations discussed above to determine lateral accelerations and angular accelerations from the accelerometer data. In some embodiments, the lateral accelerations and angular accelerations may be stored in a memory device to be retrieved when the downhole tool 402 is tripped out of the borehole. In some embodiments, the processor may be configured to transmit the calculated values through wireless or wired connections to other components in the drill string. For example, a control module may be configured to receive the acceleration calculations and adjust control parameters of the drill string based on the acceleration calculations. In some embodiments, the acceleration calculations may be transmitted to an operator at the surface, such that the operator may make operational decisions based on the acceleration calculations.

In some embodiments, the sensor arrangements 400, 500, 600, 700 discussed above may include additional sensors, such as gyroscopes, gyrometers, and magnetometers. For example, gyroscopes may be used to measure rotational speed, high frequency torsional acceleration, etc. In some embodiments, magnetometers may be used to measure properties such as tool face, azimuth, rotational speed, etc. The gyroscopes and/or magnetometers may be positioned substantially coaxial with the Y axis 412 of the cross-section of the downhole tool 402. In some embodiments, the gyroscopes and/or magnetometers may be positioned on the same sensor board 224 as one or more of the accelerometers 404, 406, 502, 510, 602, 610, 702, 710. For example, the gyroscopes and/or magnetometer may be positioned on an opposite side of the sensor board 224 (e.g., similar to the arrangement of the first accelerometer 702 and the second accelerometer 710 in sensor arrangement 700). In some embodiments, the gyroscopes and/or magnetometer may be positioned on the sensor board 224 at a different cross-sectional location, such as being displaced from the respective accelerometers 404, 406, 502, 510, 602, 610, 702, 710 in a direction of the Z axis 414 of the downhole tool 402.

Figure 8:
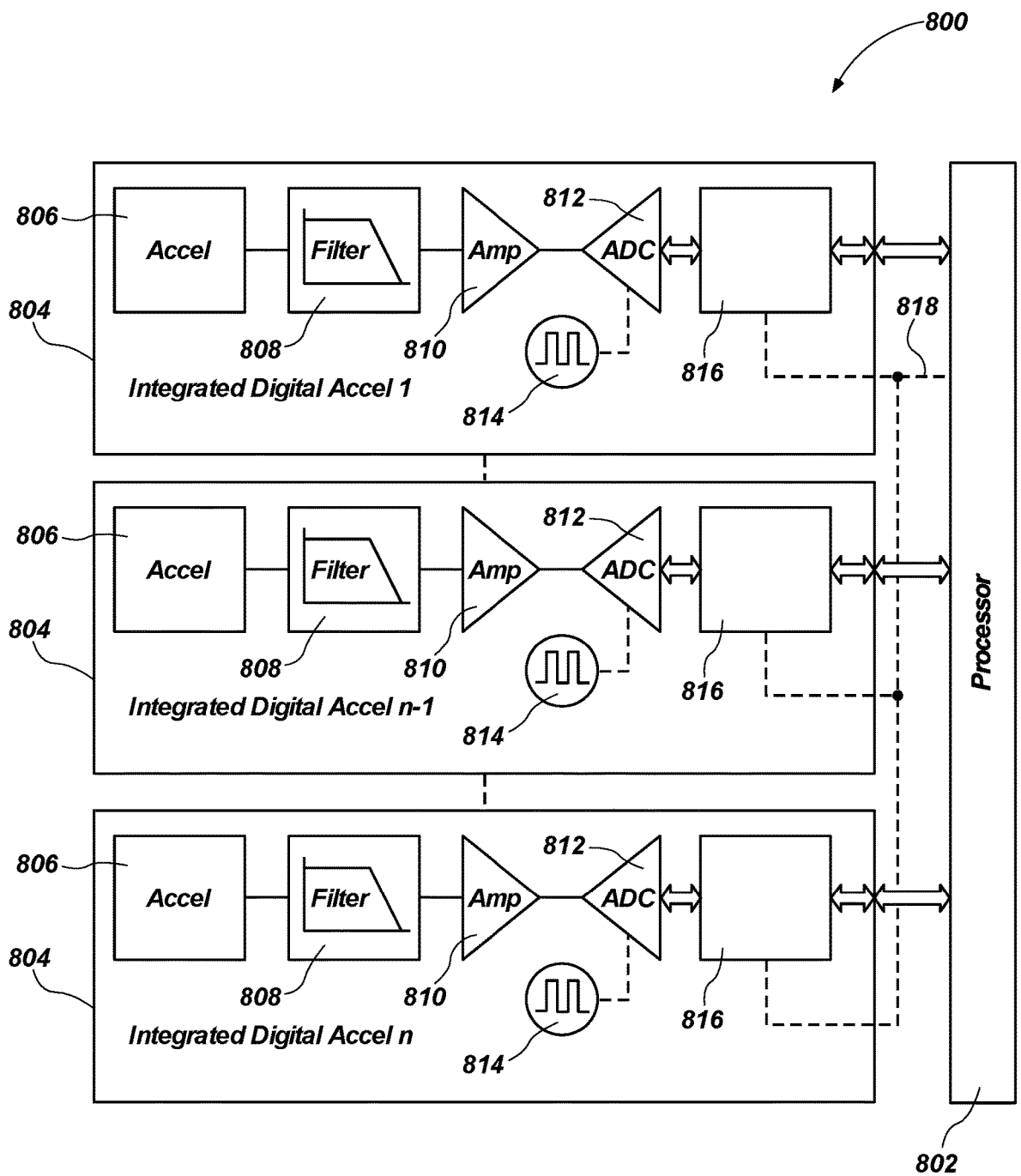
FIG. 8 illustrates a schematic view of a sensor arrangement according to an embodiment of the present disclosure.

FIG. 8 illustrates a schematic view of an embodiment of a sensor arrangement 800 including multiple integrated accelerometers 804 coupled to a processor 802. Each of the integrated accelerometers 804 may include one or more accelerometers 806. For example, an integrated accelerometer 804 may include an X axis accelerometer 806, a Y axis accelerometer 806, and a Z axis accelerometer 806. In some embodiments, each accelerometer 806 may be a separate integrated accelerometer 804. For example, one of the integrated accelerometers 804 may be an X axis integrated accelerometer 804, one of the integrated accelerometers 804 may be a Y axis integrated accelerometer 804, and one of the integrated accelerometers 804 may be a Z axis integrated accelerometer 804.

The accelerometers 806 may be configured to produce an analog signal representative of accelerations in a direction according to an orientation of the accelerometer 806. The analog signal may pass through a filter 808, such as a low pass filter. The filter 808 may be configured to remove noise from the analog signal, such as electronic noise (e.g., noise generated by electronics, noise generated by electrical fields, etc.).

The filtered analog signal may pass from the filter 808 to an amplifier 810. The amplifier 810 may be configured to amplify the filtered analog signal. Amplifying the filtered analog signal may increase a sensitivity of the signal sent to the processor 802. For example, small changes to the signal may be increased through the amplification such that a change that may not have been detectable by the processor 802 may be a detectable change after amplification.

The amplified signal may then pass through an analog to digital converter 812 configured to convert the signal into a digital signal. A time clock 814 may be coupled to the analog to digital converter 812 such that the analog to digital converter 812 may record a digital value from the analog signal on pulses from the time clock 814. In some embodiments, the pulses from the time clock 814 may be between about one pulse per second and about 5000 pulses per second, such as between about 1 pulse per second and about 2,500 pulses per second.

The digital signal may then be passed to a digital data handler 816. The digital data handler 816 may be configured to receive and/or store digital signal values. The digital data handler 816 may also be configured to transmit the digital signal values to the processor 802. In some embodiments, the processor 802 may be configured to control when digital signal values are sent to the processor 802. For example, the processor 802 may send a trigger signal 818 to the digital data handlers 816. Upon receiving the trigger signal 818 the digital data handlers 816 may each transmit the respective values to the processor 802.

When performing the calculations discussed above, the accuracy of the calculated values may depend on the readings from the different accelerometers being collected at substantially the same time, such that substantially the same accelerations are being detected by each of the accelerometers. In some embodiments, the processor 802 may cause the digital data handlers 816 for each of the integrated accelerometers 804 to transmit signal values at substantially the same time through the trigger signal 818. In some embodiments, the trigger signal 818 may be configured to synchronize the time clocks 814 of each of the integrated accelerometers 804, such that the pulses sent by each of the time clocks 814 to the associated analog to digital converters 812 occur at substantially the same time. If the pulses occur at substantially the same time, the analog to digital converters 812 may then each convert the analog signal values to digital values at substantially the same time.

Figure 9:
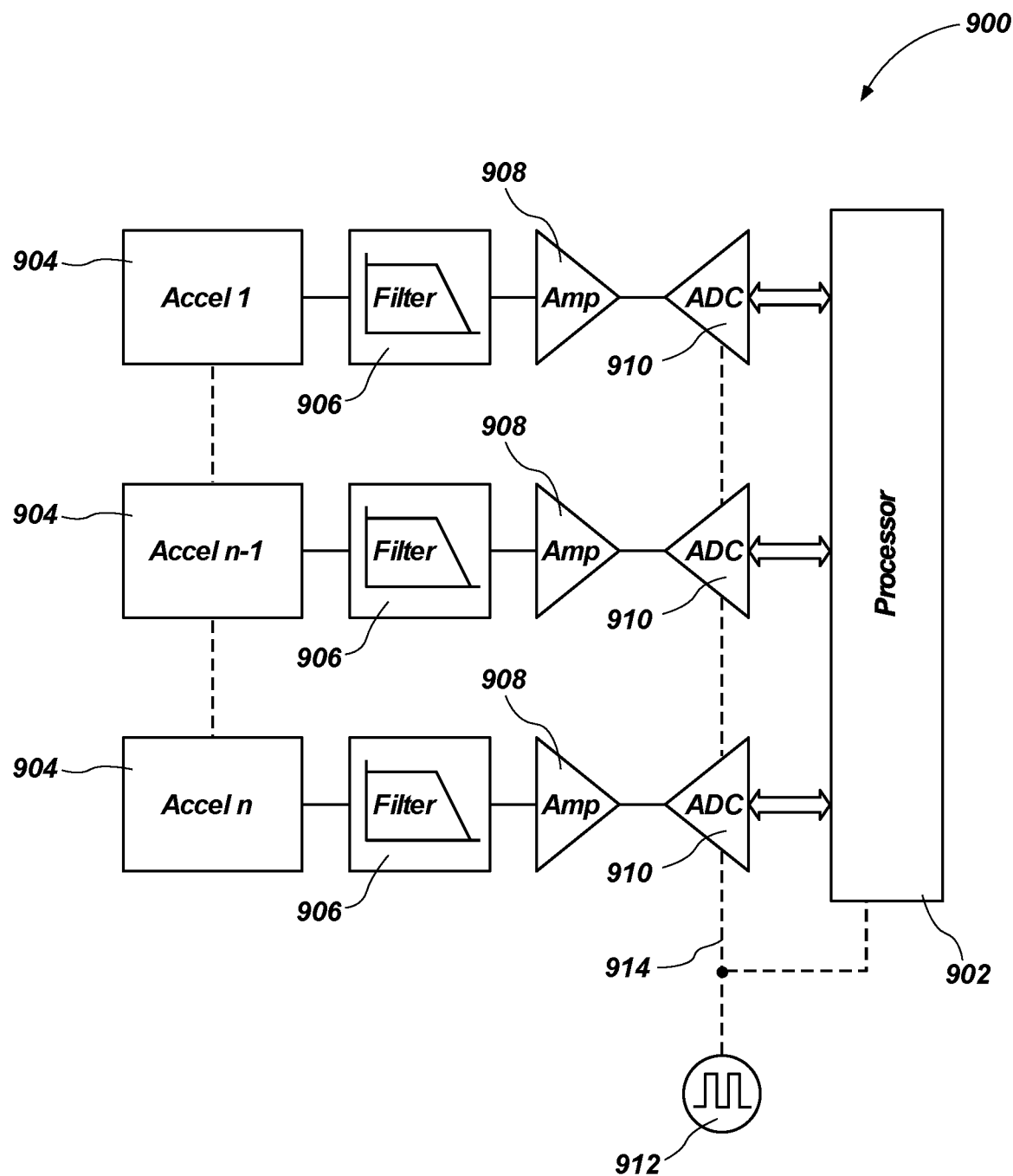
FIG. 9 illustrates a schematic view of a sensor arrangement according to an embodiment of the present disclosure.

FIG. 9 illustrates a schematic view of an embodiment of a sensor arrangement 900 including multiple accelerometers 904 coupled to a processor 902. In some embodiments, each of the accelerometers 904 may include one or more accelerometers. For example, an accelerometer 904 may include an X axis accelerometer, a Y axis accelerometer, and a Z axis accelerometer. In some embodiments, each accelerometer 904 may be a single accelerometer 904 configured to measure acceleration in a single axis, such that three accelerometers 904 may be combined to capture three dimensions of rotation (e.g., X axis, Y axis, and Z axis rotation).

The accelerometers 904 may be configured to produce an analog signal representative of accelerations in a direction according to an orientation of the accelerometer 904. The analog signal may pass through a filter 906, such as a low pass filter. The filter 906 may be configured to remove noise from the analog signal, such as electronic noise.

The filtered analog signal may pass from the filter 906 to an amplifier 908. The amplifier 908 may be configured to amplify the filtered analog signal. Amplifying the filtered analog signal may increase a sensitivity of the signal sent to the processor 902. For example, small changes to the signal may be increased through the amplification such that a change that may not have been detectable by the processor 802 may be a detectable change after amplification.

The amplified signal may then pass through an analog to digital converter 910 configured to convert the signal into a digital signal. A time clock 912 may be coupled to the analog to digital converter 910 such that the analog to digital converter 910 may record a digital value from the analog signal on pulses from the time clock 912. In some embodiments, the pulses from the time clock 912 may be between about one pulse per second and about 5000 pulses per second, such as between about 1 pulse per second and about 2,500 pulses per second.

A single time clock 912 may be coupled to all of the analog to digital converters 910, such that a common pulse 914 is sent to each of the analog to digital converters 910. The common pulse 914 may cause each of the analog to digital converters 910 to record a digital value from the respective analog signals at substantially the same time. By recording the digital values of each of the accelerometers 904 at substantially the same time, the processor 902 may perform the calculations described above with accelerometer values captured at substantially the same time. Performing the calculations with values captured at substantially the same time may increase the accuracy of the calculations by ensuring that each of the accelerometers 904 are measuring substantially the same accelerations.

Figure 10:
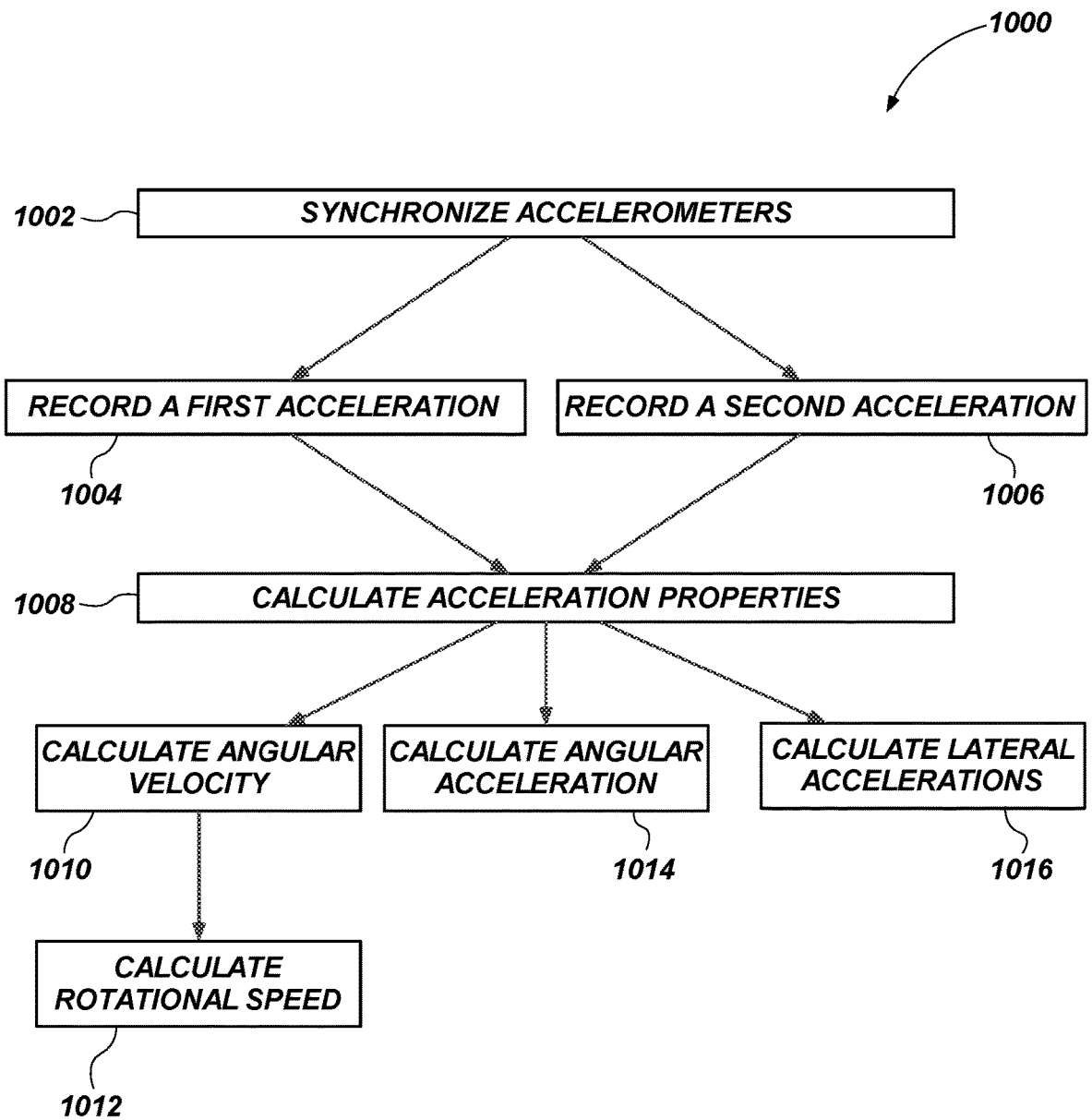
FIG. 10 illustrates a flow chart representative of a method of calculating acceleration properties of a downhole tool in accordance with embodiments of the present disclosure.

FIG. 10 illustrates a flow chart representative of a method of calculating properties of motion of a downhole tool 1000. Referring also to FIGS. 1-9. As discussed above the sensor arrangement may include multiple accelerometers. The accelerometers may be synchronized in act 1002. For example, the processor may send a synchronizing trigger to the accelerometer or a component thereof. The synchronizing trigger may be configured to synchronize a time when the accelerometer records acceleration data. For example, the accelerometer may record acceleration data each time a trigger is received. In some embodiments, the accelerometer may include an internal time clock configured to control when the acceleration data is recorded and the trigger may be configured to synchronize the internal time clocks of each of the accelerometers, such that each time clock causes the different accelerometers to record the acceleration data at substantially the same time. In some embodiments, the sensor arrangement may include a common time clock. The common time clock may be configured to send a trigger or pulse to each of the accelerometers at substantially the same time. Each of the accelerometers may be configured to record the acceleration data when the trigger or pulse is received, such that each of the accelerometers may record the associated acceleration data at substantially the same time.

Once the accelerometers are synchronized, an acceleration measurement from a first accelerometer may be recorded in act 1004 and an acceleration measurement from a second accelerometer may be recorded in act 1006. The acceleration measurement from the first and second accelerometers may include multiple acceleration measurements. For example, the first accelerometer may include acceleration measurements about multiple axes, such as an X axis acceleration, a Y axis acceleration, and a Z axis acceleration. Similarly, the second accelerometer may include acceleration measurements about multiple axes, such as an X axis acceleration, a Y axis acceleration, and a Z axis acceleration. In some embodiments, each accelerometer may only measure acceleration about a single axis. In some embodiments, acceleration measurements may be recorded from additional accelerometers, such as three accelerometers, four accelerometers, six accelerometers, eight accelerometers, etc. Because the accelerometers where synchronized in act 1002, the measurements recorded from each of the accelerometers in acts 1004 and 1006 may correspond to substantially the same time.

Once the acceleration measurements are recorded in acts 1004 and 1006, acceleration properties of the associated downhole tool may be calculated in act 1008. For example, the acceleration properties may include lateral acceleration about the X-axis of the downhole tool, lateral acceleration about the Y axis of the tool, angular acceleration of the downhole tool, angular velocity of the downhole tool, and rotational speed of the downhole tool. In some embodiments, act 1008 may be performed by a processor included in the sensor arrangement, such as a processor included on the sensor board 224. In some embodiments, the calculations may be performed by a remote processor, such as a control module, sensor module, computer, tablet, control board, server computer, cloud computer, etc. For example, the acceleration measurements may be recorded to a memory device and stored until an external processor can access the acceleration measurements, such as when the downhole tool is tripped out of the borehole. In some embodiments, the acceleration measurements may be transmitted to another downhole module where the calculations may be performed. For example, the measurements may be wirelessly transmitted to another downhole module, such as through a radio frequency signal. In some embodiments, the measurements may be transferred to another downhole module through wiring such as network wiring.

An angular velocity ($\omega$) may be calculated using the one or more of the acceleration measurements about the X axis and/or the Y axis of the multiple accelerometers as well as dimensional relationships between the multiple accelerometers and the downhole tool in act 1010. As described above, the governing equations for calculating the angular velocity may change depending on the specific sensor arrangement. The angular velocity may be used to calculate a rotational speed (RPM) of the downhole tool in act 1012 using the governing equations discussed above.

The angular acceleration ($A_{ang}$) may be calculated using one or more of the acceleration measurements about the X axis and/or the Y axis of the multiple accelerometers as well as dimensional relationships between the multiple accelerometers and the downhole tool in act 1014. As described above, the governing equations for calculating the angular acceleration may change depending on the specific sensor arrangement.

The lateral acceleration in the direction of each of the axes (e.g., X axis and Y axis) may be calculated using one or more of the acceleration measurements about the X axis and the Y axis of the multiple accelerometers as well as dimensional relationships between the multiple accelerometers and the downhole tool in act 1016. As described above, the governing equations for calculating the lateral accelerations may change depending on the specific sensor arrangement.

Embodiments of the present disclosure may enable acceleration measurements to be separated into individual acceleration properties. Separating the acceleration measurements may enable a number of sensors on a downhole tool to be decreased. For example, rather than having multiple complex separate sensors configured to measure rotation, tilt, azimuth, etc., measurements from relatively simple sensors such as accelerometers may be used to calculate the individual acceleration properties and therefore calculate properties of the downhole tool, such as rotational speed, tilt, azimuth, angular acceleration, and lateral accelerations.

Reducing the number of complex sensors on a downhole tool may increase a reliability of the downhole tool. In some cases, complex sensors may be larger and require more power to operate. Therefore, reducing the number of complex sensors on a downhole tool may decrease the power required to operate a sensor system, such as a self-contained sensor assembly or a logging while drilling (LWD) system. In some cases, reducing the number of complex sensors on a downhole tool for measuring acceleration properties may enable the placement of other complex sensors or sensor with high power loads to measure other properties of the drill string, downhole tool, and/or formation.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A downhole tool comprising:
a housing; and
a sensor structure disposed in the housing, the sensor structure comprising:
at least two accelerometers having at least two axes of measurement, the at least two accelerometers comprising:
a first accelerometer in a first position; and
a second accelerometer in a second position, wherein a first axis of the second accelerometer is coaxial with a first axis of the first accelerometer, a second axis of the second accelerometer is parallel to and offset from a second corresponding axis of the first accelerometer, and the fist axis of the first accelerometer and the first axis of the second accelerometer are coaxial with a first axis of the downhole tool passing through a center of the downhole tool.

2. The downhole tool of claim 1 wherein the first accelerometer and the second accelerometer are coupled to a sensor board.

3. The downhole tool of claim 2, wherein the first accelerometer is coupled to a first side of the sensor board and the second accelerometer is coupled to a second opposite side of the sensor board.

4. The downhole tool of claim 1, wherein the first accelerometer is coupled to a first sensor board and the second accelerometer is coupled to a second sensor board.

5. The downhole tool of claim 4, wherein the first sensor board is positioned on a first side of the downhole tool and the second sensor board is positioned on a second opposite side of the downhole tool.

6. The downhole tool of claim 1, wherein the first axis of the second accelerometer is offset from a corresponding axis of the downhole tool in a direction defined by the second axis of the first accelerometer.

7. The downhole tool of claim 1, wherein the second axis of the second accelerometer is parallel to and offset from a corresponding axis of the downhole tool.

8. A downhole sensor system comprising:
a sensor structure disposed on a downhole apparatus, the sensor structure positioned a distance from a central axis of the downhole apparatus;
at least two sensors positioned on the sensor structure, the at least two sensors having at least two axes of measurement, the at least two sensors comprising:
a first sensor in a first position; and
a second sensor in a second position, wherein a first axis of the second sensor is substantially coaxial with a first axis of the first sensor and a second axis of the second sensor is parallel to and offset from a second corresponding axis of the first sensor; and
at least one processor; and
at least one non-transitory computer-readable storage medium storing instructions thereon that,
when executed by the at least one processor, cause the processor to:
measure a first acceleration from the first sensor;
measure a second acceleration from the second sensor; and
calculate acceleration properties of the downhole sensor system based on position measurements of the first sensor and the second sensor and acceleration measurements of the first sensor and the second sensor.

9. The downhole sensor system of claim 8, further comprising a timing device.

10. The downhole sensor system of claim 9, wherein the timing device is configured to provide a trigger to at least one of the processor and the at least two sensors.

11. The downhole sensor system of claim 10, wherein the trigger is configured to synchronize the at least two sensors.

12. The downhole sensor system of claim 8, wherein the instructions cause the at least one processor to measure the first acceleration and the second acceleration at substantially a same time.

13. The downhole sensor system of claim 8, wherein at least one of the at least two sensors comprises a gyroscope.

14. The downhole sensor system of claim 8, wherein at least one of the at least two sensors comprises an accelerometer.

15. A method of calculating acceleration properties of a downhole tool, the method comprising:
synchronizing a first accelerometer and a second accelerometer;

measuring a first acceleration from the first accelerometer about at least two axes;

measuring a second acceleration from the second accelerometer about at least two axes, wherein a first axis of the at least two axes of the second accelerometer is coaxial with a first axis of the at least two axes of the first accelerometer and a second axis of the at least two axes of the second accelerometer is parallel to and offset from a second corresponding axis of the at least two axes of the first accelerometer; and calculating the acceleration properties of the downhole tool based on position measurements of the first accelerometer and the second accelerometer and acceleration measurements of the first accelerometer and the second accelerometer, wherein the acceleration properties include an angular acceleration and a lateral acceleration.

16. The method of claim 15, wherein synchronizing the first accelerometer and the second accelerometer comprises providing a trigger to the first accelerometer and the second accelerometer.

17. The method of claim 16, further comprising recording the first acceleration and the second acceleration at a time when the trigger is received by the first accelerometer and the second accelerometer.

18. The method of claim 15, wherein the position measurements include a distance between a center of the downhole tool and each of the first accelerometer and the second accelerometer in directions defined by the first axis of the at least two axes of the first accelerometer, the second axis of the at least two axes of the first accelerometer, the first axis of the at least two axes of the second accelerometer, and the second axis of the at least two axes of the second accelerometer.

* * * * *